United States Patent
Hosaka et al.

(10) Patent No.: US 8,077,863 B2
(45) Date of Patent: Dec. 13, 2011

(54) SECRET SHARING APPARATUS, METHOD, AND PROGRAM

(75) Inventors: Norikazu Hosaka, Fuchu (JP); Yoshihiro Fujii, Fuchu (JP); Minako Tada, Komae (JP); Takehisa Kato, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 919 days.

(21) Appl. No.: 12/051,524

(22) Filed: Mar. 19, 2008

(65) Prior Publication Data
US 2008/0232580 A1  Sep. 25, 2008

(30) Foreign Application Priority Data
Mar. 23, 2007 (JP) ................................. 2007-077421

(51) Int. Cl.
H04K 1/00 (2006.01)
H04L 9/00 (2006.01)
H04L 9/28 (2006.01)
H04L 29/06 (2006.01)
G06F 15/16 (2006.01)

(52) U.S. Cl. ............. 380/28; 380/46; 380/212; 713/160; 713/162; 713/163; 709/208; 709/209; 709/211

(58) Field of Classification Search ................... 380/28, 380/277
See application file for complete search history.

(56) References Cited

U.S. PATENT DOCUMENTS

| | | | | | |
|---|---|---|---|---|---|
| 5,485,474 | A | * | 1/1996 | Rabin | 714/762 |
| 5,708,714 | A | * | 1/1998 | Lopez et al. | 713/180 |
| 5,764,767 | A | * | 6/1998 | Beimel et al. | 713/180 |
| 6,182,214 | B1 | * | 1/2001 | Hardjono | 713/163 |
| 6,477,254 | B1 | * | 11/2002 | Miyazaki et al. | 380/286 |
| 2004/0148512 | A1 | * | 7/2004 | Park et al. | 713/193 |
| 2007/0160197 | A1 | * | 7/2007 | Kagaya et al. | 380/28 |

FOREIGN PATENT DOCUMENTS
JP  2004-213650  7/2004

OTHER PUBLICATIONS

"Linear Algebra and Its Applications (Second Edition)" by David C. Lay (Mar. 1997); 486 pages.*

(Continued)

Primary Examiner — Carl Colin
Assistant Examiner — Phillip Auger
(74) Attorney, Agent, or Firm — Oblon, Spivak, McClelland, Maier & Neustadt, L.L.P.

(57) ABSTRACT

A secret sharing apparatus according to the present invention is based on a (k,n)-threshold scheme with a threshold of at least 4 but is still operational with a threshold of at least 2. The secret sharing apparatus generates a generator matrix (G) of GF(2) in which any k of n column vectors are at a full rank, divides secret information into n−1 pieces to generate divided secret data (K(1), ..., K(n−1)), generates random data (U(0, 1), ..., U(k−2,n−1)), calculates the product of matrixes of the divided secret data, the random data, and the generator matrix (G), assigns the j×(n−1)+ith column of the calculation result to sharing partial data (D(j,i)) to calculate sharing partial data (D(j,1)), generates header information (H(j)), and individually distributes n pieces of sharing information (D(0), ..., D(n−1)) made up of the header information (H(j)) and sharing partial data (D(j,i)) to n storage apparatuses.

9 Claims, 32 Drawing Sheets

OTHER PUBLICATIONS

"Secret image sharing with smaller shadow images" by Ran-Zan Wang (Oct. 25, 2005); Pattern Recognition Letters; pp. 551-555; originally downloaded from http://linkinghub.elsevier.com/retrieve/pii/S0167865505002734.*

"A Reliable (k, n) Image Secret Sharing Scheme" by Li Bai (2006); Proceedings of the 2nd IEEE International Symposium on Dependable, Autonomic and Secure Computing (DASC'06); 6 pages; originally downloaded from http://ieeexplore.ieee.org/xpls/abs_all.jsp?arnumber=4030863&tag=1.*

"A Strong Ramp Secret Sharing Scheme Using Matrix Projection" by Li Bai (2006); Proceedings of the 2nd IEEE International Symposium on Dependable, Autonomic and Secure Computing (DASC'06); 5 pages; originally downloaded from http://ieeexplore.ieee.org/xpls/abs_all.jsp?arnumber=1648530.*

"Constructions and Properties of k out of n Visual Secret Sharing Schemes" by Eric R. Verheul (1997); Designs, Codes and Cryptography; pp. 179-196; originally downloaded from http://portal.acm.org/citation.cfm?id=257518.*

"Efficient visual secret sharing scheme for color images" by Shyong Jian Shyu (Jun. 3, 2005); Pattern Recognition; pp. 866-880; originally downloaded from http://linkinghub.elsevier.com/retrieve/pii/S0031320305002268.*

"New Efficient and Secure Protocols for Verifiable Signature Sharing and Other Applications" by Dario Catalano (Aug. 26, 1999); 30 pages; originally downloaded from http://citeseerx.ist.psu.edu/viewdoc/summary?doi=10.1.1.26.9201.*

"Simple and Efficient Threshold Cryptosystem from the Gap Diffie-Hellman Group" by Joonsang Baek (2003); GLOBECOM; pp. 1491-1495; originally downloaded from http://citeseerx.ist.psu.edu/viewdoc/summary?doi=10.1.1.119.1717.*

"Computer and Network Security—Key Escrow and Secret Sharing" by R.E. Newman (2000); 15 pages; originally downloaded from http://www.cise.ufl.edu/~nemo/crypto/key-escrow.pdf.*

"Key Escrow" by Ozalp Babaoglu (2006); 6 pages; originally downloaded from http://www.cs.unibo.it/~babaoglu/courses/security06-07/lucidi/key-escrow.pdf.*

"Linear Algebra and It's Applications—Second Edition" by David C. Lay (Mar. 1997); pp. xx, 2-4, 8, 26 (6 pages total); relevant pages converted to PDF originally from noted book.*

"Implementation of Shamir's method for sharing a secret" by Charles Karney (Aug. 21, 2001); 1 page; converted to PDF originally from http://charles.karney.info/misc/secret.html.*

"SSSS: Shamir's Secret Sharing Scheme—Windows port" by Alex Seidlitz (Jan. 16, 2006); 1 page; converted to PDF originally from http://www.seidlitz.ca/ssss/.*

"On secret sharing systems" by Ehud Karnin et al. (1983); 7 pages; originally downloaded from http://citeseerx.ist.psu.edu/viewdoc/summary?doi=10.1.1.132.9203.*

"Applied Cryptography—Second Edition" by Bruce Schneier (1996); pp. 528-531 (4 pages total); relevant pages converted to PDF originally from noted book.*

Adi Shamir, "How to Share a Secret", Communications of the ACM, vol. 22, No. 11, Nov. 1979, pp. 612-613.

Yoshihiro Fujii, et al., "A Fast (2,$n$)-Threshold Scheme and Its Application", Proc. CSS2005, 2005,6 pages, with English Abstract.

Jun Kurihara, et al., "A (3,n)-Threshold Secret Sharing Scheme using XOR Operations", Proc. SCIS2007, 2007, pp. 1-6.

\* cited by examiner

|  | g(D(0)) | | | | g(D(1)) | | | | g(D(2)) | | | | g(D(3)) | | | | g(D(4)) | | | | Row number |
|---|---|---|---|---|---|---|---|---|---|---|---|---|---|---|---|---|---|---|---|---|---|
| | 0 | 0 | 0 | 0 | 1 | 0 | 0 | 0 | 0 | 1 | 0 | 0 | 0 | 0 | 0 | 0 | 0 | 0 | 0 | 1 | 0 |
| | 0 | 1 | 0 | 1 | 0 | 0 | 0 | 0 | 1 | 0 | 0 | 0 | 1 | 0 | 0 | 0 | 1 | 0 | 0 | 0 | 1 |
| | 0 | 0 | 1 | 0 | 0 | 0 | 0 | 1 | 0 | 0 | 0 | 0 | 0 | 1 | 0 | 0 | 0 | 1 | 0 | 0 | 2 |
| | 1 | 0 | 0 | 0 | 0 | 0 | 1 | 0 | 0 | 0 | 1 | 0 | 0 | 0 | 0 | 1 | 0 | 0 | 1 | 0 | 3 |
| | 0 | 0 | 0 | 1 | 0 | 0 | 0 | 0 | 1 | 0 | 0 | 0 | 0 | 0 | 0 | 0 | 0 | 0 | 0 | 0 | 4 |
| | 0 | 0 | 0 | 0 | 1 | 0 | 0 | 0 | 0 | 1 | 0 | 0 | 0 | 0 | 0 | 0 | 0 | 0 | 0 | 0 | 5 |
| | 0 | 0 | 0 | 1 | 0 | 1 | 0 | 0 | 1 | 0 | 0 | 0 | 0 | 1 | 0 | 0 | 1 | 0 | 0 | 0 | 6 |
| | 0 | 0 | 1 | 0 | 0 | 0 | 1 | 0 | 0 | 0 | 0 | 1 | 0 | 0 | 1 | 0 | 0 | 0 | 1 | 1 | 7 |
| | 0 | 1 | 0 | 0 | 1 | 0 | 0 | 0 | 0 | 0 | 0 | 0 | 0 | 0 | 0 | 0 | 0 | 0 | 0 | 0 | 8 |
| | 1 | 0 | 0 | 0 | 0 | 0 | 0 | 0 | 0 | 1 | 0 | 0 | 0 | 0 | 0 | 0 | 0 | 1 | 0 | 0 | 9 |
| | 0 | 0 | 0 | 0 | 0 | 0 | 1 | 1 | 0 | 0 | 1 | 0 | 0 | 0 | 0 | 0 | 1 | 0 | 0 | 1 | 10 |
| | 0 | 0 | 0 | 0 | 0 | 1 | 0 | 0 | 0 | 0 | 0 | 1 | 1 | 0 | 0 | 1 | 0 | 0 | 1 | 0 | 11 |
| | 0 | 0 | 1 | 0 | 1 | 0 | 0 | 0 | 0 | 0 | 0 | 1 | 0 | 1 | 0 | 0 | 0 | 0 | 0 | 0 | 12 |
| | 0 | 1 | 0 | 0 | 0 | 0 | 1 | 0 | 0 | 0 | 0 | 0 | 1 | 0 | 1 | 0 | 1 | 0 | 0 | 1 | 13 |
| | 1 | 0 | 0 | 0 | 1 | 0 | 0 | 0 | 0 | 0 | 1 | 1 | 0 | 0 | 0 | 0 | 0 | 1 | 0 | 0 | 14 |
| | 0 | 0 | 0 | 1 | 0 | 0 | 0 | 1 | 0 | 0 | 0 | 0 | 0 | 1 | 0 | 1 | 0 | 0 | 0 | 0 | 15 |
| Column number | 0 | 1 | 2 | 3 | 4 | 5 | 6 | 7 | 8 | 9 | 10 | 11 | 12 | 13 | 14 | 15 | 16 | 17 | 18 | 19 | |

| | | | | | | | | | | | | | | | | Row number |
|---|---|---|---|---|---|---|---|---|---|---|---|---|---|---|---|---|
| 1 | 0 | 1 | 0 | 0 | 1 | 0 | 0 | 0 | 1 | 0 | 0 | 1 | 0 | 1 | 0 | 0 |
| 0 | 0 | 0 | 1 | 1 | 1 | 0 | 0 | 1 | 1 | 0 | 0 | 1 | 0 | 0 | 1 | 1 |
| 1 | 0 | 0 | 0 | 0 | 0 | 1 | 1 | 0 | 0 | 1 | 0 | 1 | 0 | 0 | 0 | 2 |
| 0 | 1 | 0 | 1 | 0 | 0 | 1 | 0 | 0 | 0 | 1 | 0 | 1 | 0 | 1 | 0 | 3 |
| 1 | 0 | 0 | 0 | 1 | 0 | 1 | 1 | 0 | 0 | 1 | 1 | 0 | 0 | 0 | 1 | 4 |
| 1 | 1 | 1 | 1 | 0 | 0 | 0 | 0 | 1 | 1 | 0 | 0 | 1 | 0 | 1 | 1 | 5 |
| 0 | 0 | 0 | 0 | 1 | 0 | 1 | 1 | 0 | 1 | 1 | 0 | 0 | 0 | 0 | 1 | 6 |
| 0 | 1 | 0 | 0 | 0 | 0 | 0 | 1 | 0 | 0 | 1 | 1 | 0 | 0 | 0 | 0 | 7 |
| 1 | 1 | 0 | 0 | 0 | 1 | 0 | 0 | 1 | 1 | 1 | 0 | 0 | 1 | 1 | 1 | 8 |
| 1 | 0 | 0 | 1 | 0 | 1 | 0 | 1 | 0 | 1 | 0 | 1 | 1 | 0 | 1 | 0 | 9 |
| 1 | 0 | 0 | 0 | 1 | 0 | 0 | 1 | 1 | 1 | 0 | 0 | 1 | 1 | 0 | 0 | 10 |
| 1 | 1 | 0 | 0 | 0 | 1 | 1 | 0 | 0 | 1 | 0 | 0 | 0 | 0 | 0 | 1 | 11 |
| 0 | 1 | 0 | 1 | 0 | 0 | 1 | 0 | 0 | 0 | 1 | 0 | 1 | 0 | 1 | 0 | 12 |
| 1 | 0 | 0 | 0 | 0 | 0 | 1 | 1 | 0 | 0 | 1 | 0 | 1 | 0 | 0 | 0 | 13 |
| 0 | 0 | 0 | 1 | 1 | 1 | 0 | 0 | 1 | 1 | 0 | 0 | 1 | 0 | 0 | 1 | 14 |
| 1 | 0 | 1 | 0 | 0 | 1 | 0 | 0 | 0 | 1 | 0 | 0 | 1 | 0 | 1 | 0 | 15 |
| 0 | 1 | 2 | 3 | 4 | 5 | 6 | 7 | 8 | 9 | 10 | 11 | 12 | 13 | 14 | 15 | Column number |

Inverse submatrix of G (g(D(1))⁻¹)

Submatrix of inverse submatrix of G (g(D(i_1)))⁻¹

Groups labeled: g(D(1)), g(D(2)), g(D(3)), g(D(4))⁻¹

|  | D(j,0) | D(j,1) | D(j,2) | D(j,3) |
|---|---|---|---|---|
| D(0) j=0 | K(0)⊕R(0,0) | K(4)⊕R(0,1) | K(3)⊕R(0,2) | K(2)⊕R(0,3) |
| D(1) j=1 | K(1)⊕R(1,0) | K(0)⊕R(1,1) | K(4)⊕R(1,2) | K(3)⊕R(1,3) |
| D(2) j=2 | K(2)⊕R(2,0) | K(1)⊕R(2,1) | K(0)⊕R(2,2) | K(4)⊕R(2,3) |
| D(3) j=3 | K(3)⊕R(3,0) | K(2)⊕R(3,1) | K(1)⊕R(3,2) | K(0)⊕R(3,3) |
| D(4) j=4 | K(4)⊕R(4,0) | K(3)⊕R(4,1) | K(2)⊕R(4,2) | K(1)⊕R(4,3) |

K(0)(=0) : Zero value data
K(1)~K(n-1) : n-1 divided secret data
D(i,0)~D(i,n-2) : n-1 sharing partial data
R(0,0)~R(n-1,n-2) : n(n-1) random numbers
⊕ : Exclusive OR

FIG. 4

| R(j,i) | i=0 | i=1 | i=2 | i=3 |
|---|---|---|---|---|
| j=0 | U(0,1) $\oplus$ U(1,1) $\oplus$ U(2,1) | U(0,2) $\oplus$ U(1,2) $\oplus$ U(2,2) | U(0,3) $\oplus$ U(1,3) $\oplus$ U(2,3) | U(0,4) $\oplus$ U(1,4) $\oplus$ U(2,4) |
| j=1 | U(0,1) $\oplus$ U(1,2) $\oplus$ U(2,3) | U(0,2) $\oplus$ U(1,3) $\oplus$ U(2,4) | U(0,3) $\oplus$ U(1,4) $\oplus$ U(2,0) | U(0,4) $\oplus$ U(1,0) $\oplus$ U(2,1) |
| j=2 | U(0,1) $\oplus$ U(1,3) $\oplus$ U(2,0) | U(0,2) $\oplus$ U(1,4) $\oplus$ U(2,1) | U(0,3) $\oplus$ U(1,0) $\oplus$ U(2,2) | U(0,4) $\oplus$ U(1,1) $\oplus$ U(2,3) |
| j=3 | U(0,1) $\oplus$ U(1,4) $\oplus$ U(2,2) | U(0,2) $\oplus$ U(1,0) $\oplus$ U(2,3) | U(0,3) $\oplus$ U(1,1) $\oplus$ U(2,4) | U(0,4) $\oplus$ U(1,2) $\oplus$ U(2,0) |
| j=4 | U(0,1) $\oplus$ U(1,0) $\oplus$ U(2,4) | U(0,2) $\oplus$ U(1,1) $\oplus$ U(2,0) | U(0,3) $\oplus$ U(1,2) $\oplus$ U(2,1) | U(0,4) $\oplus$ U(1,3) $\oplus$ U(2,2) |

U(0,0)~U(k-2,0) (=0) : Zero value data
U(0,1)~U(0,n-1),......,U(k-2,1)~U(k-2,n-1) : (k-1) (n-1) random numbers
$\oplus$ : Exclusive OR

FIG. 5

First minor matrix i
(ST4-2)

| | Col 0 | Col 1 | Col 2 | Col 3 | Row number |
|---|---|---|---|---|---|
| | 0 | 0 | 0 | 0 | 0 |
| | 0 | 0 | 0 | 1 | 1 |
| | 0 | 0 | 1 | 0 | 2 |
| | 0 | 1 | 0 | 0 | 3 |
| | 1 | 0 | 0 | 0 | 4 |

Column number  0  1  2  3

FIG. 9

Second minor matrix i
(ST4-5)

| | Col 0 | Col 1 | Col 2 | Col 3 | Row number |
|---|---|---|---|---|---|
| | 0 | 0 | 0 | 0 | 0 |
| | 1 | 0 | 0 | 0 | 1 |
| | 0 | 1 | 0 | 0 | 2 |
| | 0 | 0 | 1 | 0 | 3 |
| | 0 | 0 | 0 | 1 | 4 |

Column number  0  1  2  3

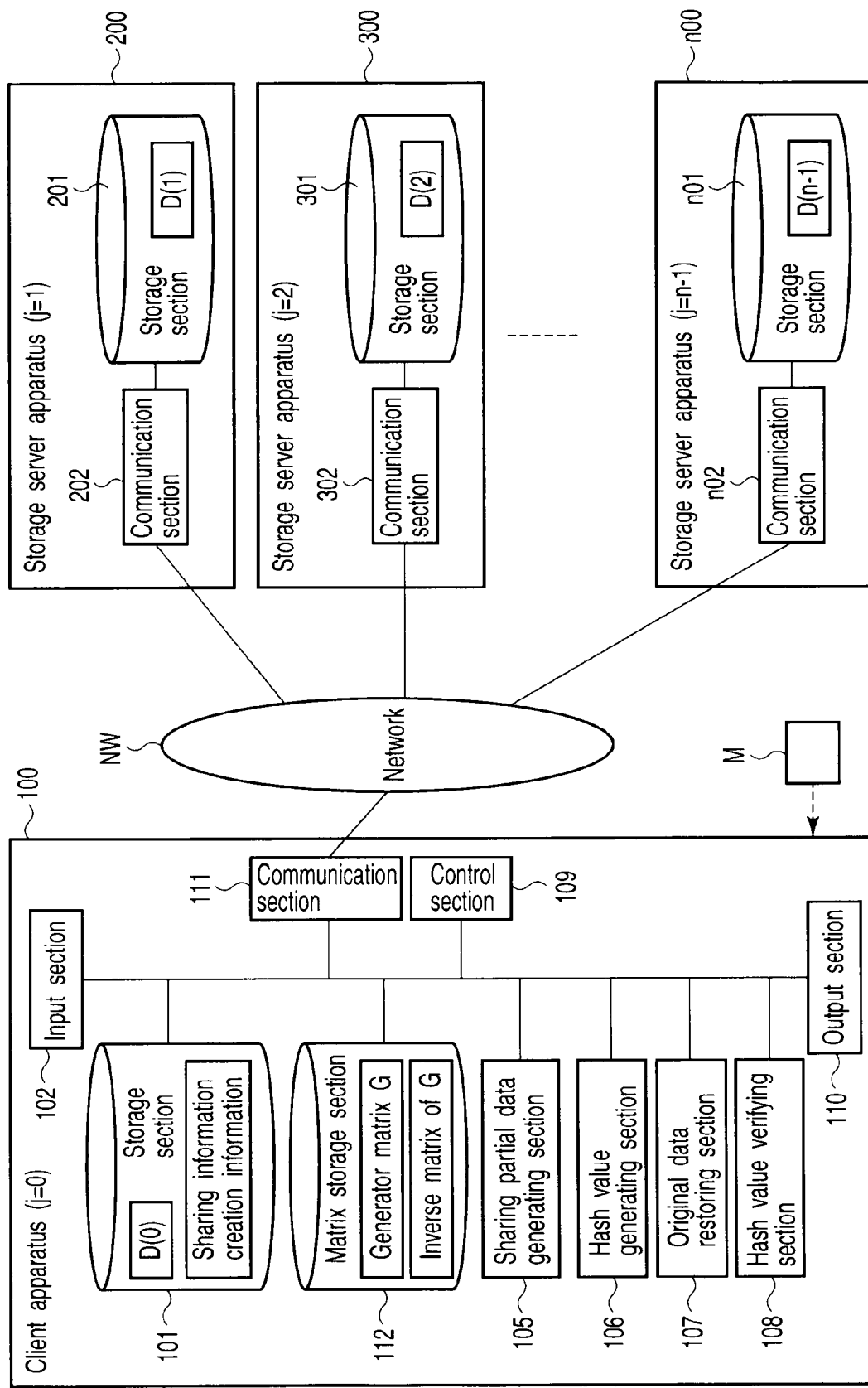
F I G. 23

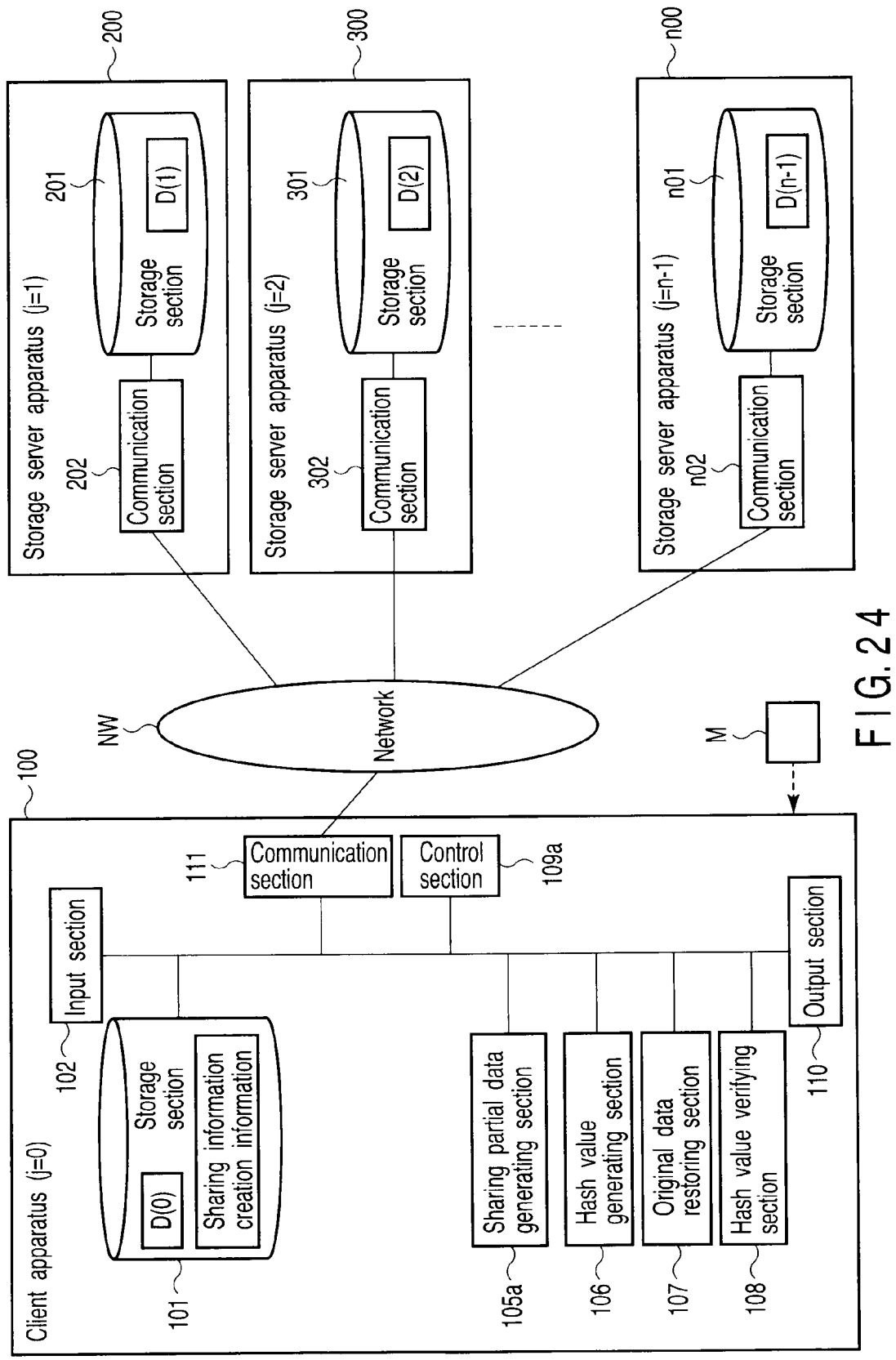
F I G. 24

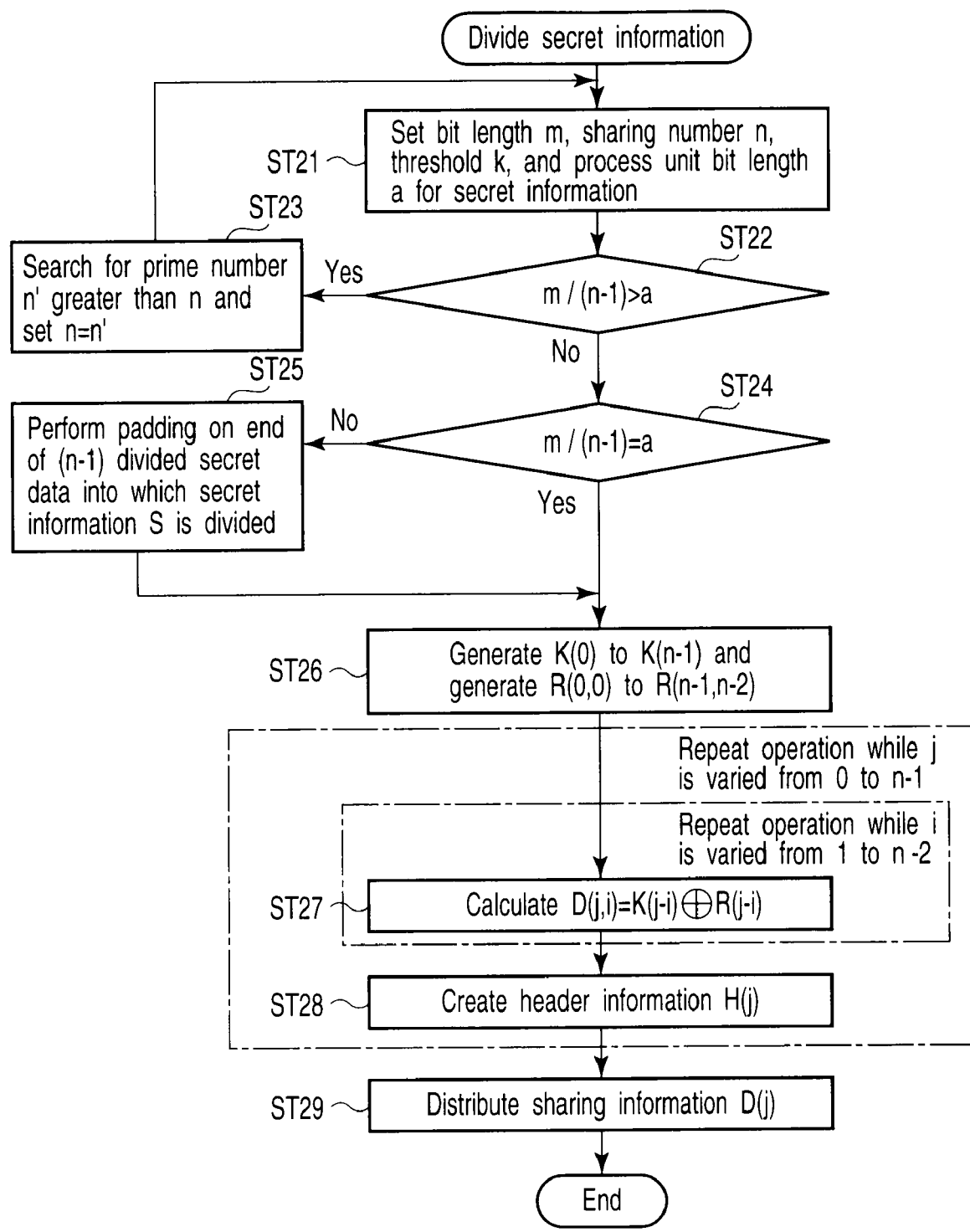
F I G. 25

FIG. 27

$$G = \begin{array}{c|cccc|cccc|cccc|cccc|cccc|c}
 & \multicolumn{4}{c|}{g(D(0))} & \multicolumn{4}{c|}{g(D(1))} & \multicolumn{4}{c|}{g(D(2))} & \multicolumn{4}{c|}{g(D(3))} & \multicolumn{4}{c|}{g(D(4))} & \text{Row number} \\
\end{array}$$

| g(D(0)) | | | | g(D(1)) | | | | g(D(2)) | | | | g(D(3)) | | | | g(D(4)) | | | | Row number |
|---|---|---|---|---|---|---|---|---|---|---|---|---|---|---|---|---|---|---|---|---|
| 0 | 0 | 0 | 1 | 0 | 0 | 1 | 0 | 0 | 1 | 0 | 0 | 1 | 0 | 0 | 0 | 0 | 0 | 0 | 0 | 0 |
| 0 | 0 | 1 | 0 | 0 | 1 | 0 | 0 | 1 | 0 | 0 | 0 | 0 | 0 | 0 | 1 | 0 | 0 | 0 | 0 | 1 |
| 0 | 1 | 0 | 0 | 1 | 0 | 0 | 0 | 0 | 0 | 0 | 0 | 0 | 0 | 1 | 0 | 0 | 1 | 0 | 0 | 2 |
| 1 | 0 | 0 | 0 | 0 | 0 | 0 | 1 | 0 | 0 | 0 | 1 | 0 | 1 | 0 | 0 | 1 | 0 | 0 | 0 | 3 |
| 0 | 0 | 0 | 0 | 1 | 0 | 0 | 0 | 0 | 0 | 0 | 0 | 0 | 0 | 0 | 1 | 0 | 0 | 0 | 0 | 4 |
| 0 | 0 | 0 | 0 | 0 | 1 | 0 | 0 | 0 | 0 | 0 | 1 | 0 | 0 | 1 | 0 | 1 | 0 | 0 | 0 | 5 |
| 0 | 0 | 0 | 1 | 0 | 0 | 1 | 0 | 0 | 0 | 1 | 0 | 0 | 1 | 0 | 0 | 0 | 0 | 0 | 1 | 6 |
| 0 | 0 | 1 | 0 | 0 | 0 | 0 | 1 | 0 | 1 | 0 | 0 | 1 | 0 | 0 | 0 | 0 | 0 | 0 | 0 | 7 |
| 0 | 1 | 0 | 0 | 0 | 0 | 0 | 0 | 0 | 0 | 0 | 1 | 0 | 0 | 0 | 0 | 0 | 1 | 0 | 0 | 8 |
| 1 | 0 | 0 | 0 | 0 | 0 | 0 | 0 | 0 | 0 | 1 | 0 | 0 | 0 | 0 | 0 | 1 | 0 | 0 | 0 | 9 |
| 0 | 0 | 0 | 0 | 0 | 0 | 0 | 0 | 0 | 1 | 0 | 0 | 1 | 0 | 0 | 0 | 0 | 0 | 0 | 0 | 10 |
| 0 | 0 | 0 | 0 | 0 | 0 | 0 | 0 | 1 | 0 | 0 | 0 | 0 | 1 | 0 | 0 | 0 | 0 | 0 | 0 | 11 |
| 0 | 0 | 0 | 1 | 0 | 0 | 0 | 1 | 0 | 0 | 0 | 1 | 0 | 0 | 0 | 1 | 0 | 0 | 1 | 0 | 12 |
| 0 | 0 | 1 | 0 | 0 | 0 | 1 | 0 | 0 | 0 | 1 | 0 | 0 | 0 | 0 | 0 | 0 | 0 | 0 | 0 | 13 |
| 0 | 1 | 0 | 0 | 0 | 1 | 0 | 0 | 0 | 1 | 0 | 0 | 0 | 0 | 0 | 0 | 1 | 0 | 0 | 0 | 14 |
| 1 | 0 | 0 | 0 | 1 | 0 | 0 | 0 | 1 | 0 | 0 | 0 | 0 | 0 | 0 | 0 | 0 | 0 | 0 | 0 | 15 |
| 0 | 1 | 2 | 3 | 4 | 5 | 6 | 7 | 8 | 9 | 10 | 11 | 12 | 13 | 14 | 15 | 16 | 17 | 18 | 19 | Column number |

F I G. 29

|  | D(j,0) | D(j,1) | D(j,2) | D(j,3) |
|---|---|---|---|---|
| D(0) j=0 | R(0,0) ⊕ K(1) | R(0,1) ⊕ K(2) | R(0,2) ⊕ K(3) | R(0,3) ⊕ K(4) |
| D(1) j=1 | R(1,0) ⊕ K(4) | R(1,1) ⊕ K(0) | R(1,2) ⊕ K(1) | R(1,3) ⊕ K(2) |
| D(2) j=2 | R(2,0) ⊕ K(2) | R(2,1) ⊕ K(3) | R(2,2) ⊕ K(4) | R(2,3) ⊕ K(0) |
| D(3) j=3 | R(3,0) ⊕ K(0) | R(3,1) ⊕ K(1) | R(3,2) ⊕ K(2) | R(3,3) ⊕ K(3) |
| D(4) j=4 | R(4,0) ⊕ K(3) | R(4,1) ⊕ K(4) | R(4,2) ⊕ K(0) | R(4,3) ⊕ K(1) |

K(0)(=0) : Zero value data
K(1)~K(n-1) : n-1 divided secret data
D(i,0)~D(i,n-2) : n-1 sharing partial data
R(0,0)~R(n-1,n-2) : n(n-1) random numbers
⊕ : Exclusive OR

F I G. 3 3

SECRET SHARING APPARATUS, METHOD, AND PROGRAM

CROSS-REFERENCE TO RELATED APPLICATIONS

This application is based upon and claims the benefit of priority from prior Japanese Patent Application No. 2007-077421, filed Mar. 23, 2007, the entire contents of which are incorporated herein by reference.

BACKGROUND OF THE INVENTION

1. Field of the Invention

The present invention relates to a secret sharing apparatus, method, and program using a (k,n)-threshold scheme, and for example, to a secret sharing apparatus, method, and program enabling implementation of the (k,n)-threshold scheme that can be performed at a high speed without using polynomial interpolation.

2. Description of the Related Art

In general, pre-making a copy of secret information such as an enciphering key is effective for providing for a possible situation in which the secret information is lost. However, making a copy of secret information disadvantageously increases the risk of theft. As a technique for solving this problem, Shamir has proposed a secret sharing scheme called a (k,n)-threshold scheme (see, for example, A. Shamir; "How to Share a secret", Communications of the ACM, 22, 11, pp. 612-613 (1979)).

The (k,n)-threshold scheme divides secret information into n pieces of sharing information so that the original information can be restored by collecting any k of the n pieces of sharing information but so that no information on the original secret information can be obtained from k−1 pieces of sharing information. That is, the (k,n)-threshold scheme has the property of restoring secret information using a threshold k as a boundary (1<k<n).

Thus, according to the (k,n)-threshold scheme, even if at most k−1 pieces of sharing information are leaked, the original secret is secure. This makes it possible to achieve management such that even if at most n−k pieces of sharing information are lost, the original information can be restored.

However, the Shamir (k,n)-threshold scheme executes processes of sharing and restoring secret information using polynomial interpolation, which requires a large amount of calculation. Thus, the Shamir (k,n)-threshold scheme disadvantageously requires high-speed calculation in order to allow a large amount of secret data to be shared.

On the other hand, a scheme of Fujii et al. and a scheme of Kurihana et al. are known as (k,n)-threshold schemes solving these disadvantages to enable a sharp reduction in calculation amount (see, for example, Yoshihiro Fujii, Minako Tada, Norikazu Hosaka, Koya Tochikubo, and Takehisa Kato: A Fast (2,n)-Threshold Scheme and Its Application", SCC2005 collection of preliminary papers, (2005), and Jun Kurihara, Shinsaku Kiyomoto, Kazuhide Fukushima, and Toshiaki Tanaka: "A (3,n)-Threshold Secret Sharing Scheme using XOR Operations", SCIS2007 collection of preliminary papers, (2007)). The scheme of Fujii et al. and the scheme of Kurihana et al. can be performed at a high speed because the schemes execute the processes of sharing and restoring secret information using only exclusive OR operations.

However, the scheme of Fujii et al. and the scheme of Kurihana et al. disadvantageously limit the threshold k to 2 or 3.

As described above, the Shamir (k,n)-threshold scheme uses polynomial interpolation, disadvantageously requiring high-speed calculation. On the other hand, the scheme of Fujii et al. and the scheme of Kurihana et al. disadvantageously limit the threshold k to 2 or 3.

BRIEF SUMMARY OF THE INVENTION

An object of the present invention is to provide a secret sharing apparatus, method, and program which makes it possible to implement a (k,n)-threshold scheme with a threshold of at least 4 which can be performed at a high speed without the need of polynomial interpolation.

In a first aspect of the present invention, there is provided a secret sharing apparatus based on a (k,n)-threshold scheme and configured to individually distribute n ($n \geq k \geq 4$) pieces of sharing information $D(0), \ldots, D(n-1)$ into which secret information S is divided, to n storage apparatuses and to restore the secret information S from any k of the n pieces of sharing information, the apparatus comprising: a generator matrix generating device configured to generate a generator matrix G of GF(2) comprising n column vectors each having a size of $k(n-1)$ rows $\times (n-1)$ columns, any k of the n column vectors being at a full rank (the generator matrix G has a size of $k(n-1)$ rows $\times n(n-1)$ columns and GF(2) is a finite field of order 2); a storage device configured to temporarily store the secret information S before the distribution of the sharing information $D(0)$ to $D(n-1)$; a divided secret data generating device configured to divide the secret information into n−1 pieces and to assign a row number j ($1 \leq j \leq n-1$) varying from 1 to n−1 to a division result to generate n−1 first divided secret data $K(1), \ldots, K(j), \ldots, K(n-1)$ having the same size; a random number data generating device configured to generate $(k-1)(n-1)$ random numbers each of the same size as that of each of the divided secret data and to assign a row number h ($0 \leq h \leq k-2$) and a column number g ($i \leq g \leq n-1$) to the random numbers to generate random number data $U(0,1), \ldots, U(h,g), \ldots, U(k-1,n-1)$; a sharing partial data calculating device configured to calculate a product of matrixes of the divided secret data and random number data $(K(1), \ldots, K(j), \ldots, K(n-1), U(0,1), \ldots, U(h,g), \ldots, U(k-2,n-1))$ and the generator matrix G (the calculation is performed on GF(2)) and to assign a $j \times (n-1)+i$th column which is a calculation result to sharing partial data $D(j,i)$ to calculate $n(n-1)$ sharing partial data $D(j,i)$ ($0 \leq j \leq n-1$, $0 \leq i \leq n-2$); a header information generating device configured to assign the row number j to every n−1 sharing partial data $D(j,0)$ to $D(j,n-2)$ having the same row number j to generate n pieces of header information $H(0), \ldots, H(j), \ldots, H(n-1)$; and a sharing information distributing device configured to individually distribute n pieces of sharing information $D(0), \ldots, D(j), \ldots, D(n-1)$ comprising the header information $H(j)$ and sharing partial data $D(j,0)$ to $D(j,n-2)$ having the same row number j, to the n storage apparatuses.

In a second aspect of the present invention, there is provided a secret sharing apparatus based on a (k,n)-threshold scheme and configured to individually distribute n ($n \geq k \geq 4$) pieces of sharing information $D(0), \ldots, D(n-1)$ into which secret information S is divided, to n storage apparatuses and to restore the secret information S from any k of the n pieces of sharing information, the apparatus comprising: a storage device configured to temporarily store the secret information S before the distribution of the sharing information $D(0)$ to $D(n-1)$; a first divided secret data generating device (105a) configured to divide the secret information into n−1 pieces and to assign a row number j ($i \leq j \leq n-1$) varying from 1 to n−1 to a division result to generate n−1 first divided secret data K(1), ..., K(j), ..., K(n−1) having the same size; a second divided secret data generating device configured to create a zero value of the same size as that of each of the divided secret data and to assign the row number j=0 to a creation result to generate second divided secret data K(0); a first random number data generating device configured to create k−1 zero value data each of the same size as that of each divided secret data and to assign a row number h ($0 \leq h \leq k-2$) and a column number g=0 to the zero value data to generate random number data U(0,0), U(h, 0), ..., U(k−2,0); a second random number data generating device configured to generate k−1 random numbers each of the same size as that of each divided secret data and to assign the row number h ($0 \leq h \leq k-2$) and the column number g ($1 \leq g \leq n-1$) to the random numbers to generate random number data U(0,1), ..., U(h, g), ..., U(k−2,n−1); a random number data calculating device configured to calculate n(n−1) random number data R(j,i)=U (0, h×j+i+1(mod n))(+) ... (+)U (h, h×j+i+1(mod n)) (+) ... (+)U (k−1, h×j+i+1(mod n)) on the basis of the random number data U(0,0), ..., U(h, g), ..., U(k−2,n−1) ((+) is a symbol representing exclusive OR); a sharing partial data calculating device configured to calculate n(n−1) sharing partial data D(j,i)=K(j−1(mod n))(+)R(j,i) on the basis of the sharing partial data K(0), K(1), ..., K(j), ..., K(n−1) and the random number data R(0,0), ..., R(i,j) ..., R(n−1,n−2); a header information generating device configured to assign the row number j to every n−1 pieces of sharing partial data D(j,0) to D(j,n−2) which are included in the generated sharing partial data and which have the same row number j, to generate n pieces of header information H(0), ..., H(j), ..., H(n−1); and a sharing information distributing device (109a, 111) configured to individually distribute the n pieces of sharing information D(0), ..., D(j), ..., D(n−1) comprising the header information H(j) and sharing partial data D(j,0) to D(j,n−2) having the same row number j, to the n storage apparatuses.

The first and second aspects are expressed as the "apparatuses". However, the present invention is not limited to these aspects. These aspects may be expressed as a "program", a "storage medium storing a program", or a "method".

The first aspect is configured to use a generator matrix G to generate sharing partial data to enable processes of sharing and restoring secret information to be executed at a very high speed using exclusive OR, allowing a (k,n) threshold scheme with a threshold of at least 4 to be implemented without using polynomial interpolation.

The second aspect is configured to generate sharing partial data as is the case with the generator matrix G to enable the process of sharing secret information to be executed at a very high speed using exclusive OR, allowing a (k,n) threshold scheme with a threshold of at least 4 to be implemented without using polynomial interpolation.

BRIEF DESCRIPTION OF THE SEVERAL VIEWS OF THE DRAWING

FIG. 2 is a schematic diagram showing an example of a generator matrix according to the first embodiment;

FIG. 3 is a schematic diagram showing an example of an inverse matrix according to the first embodiment;

FIG. 4 is a schematic diagram showing an example of sharing partial data according to the first embodiment;

FIG. 5 is a schematic diagram showing an example of random number data according to the first embodiment;

Figure 15:
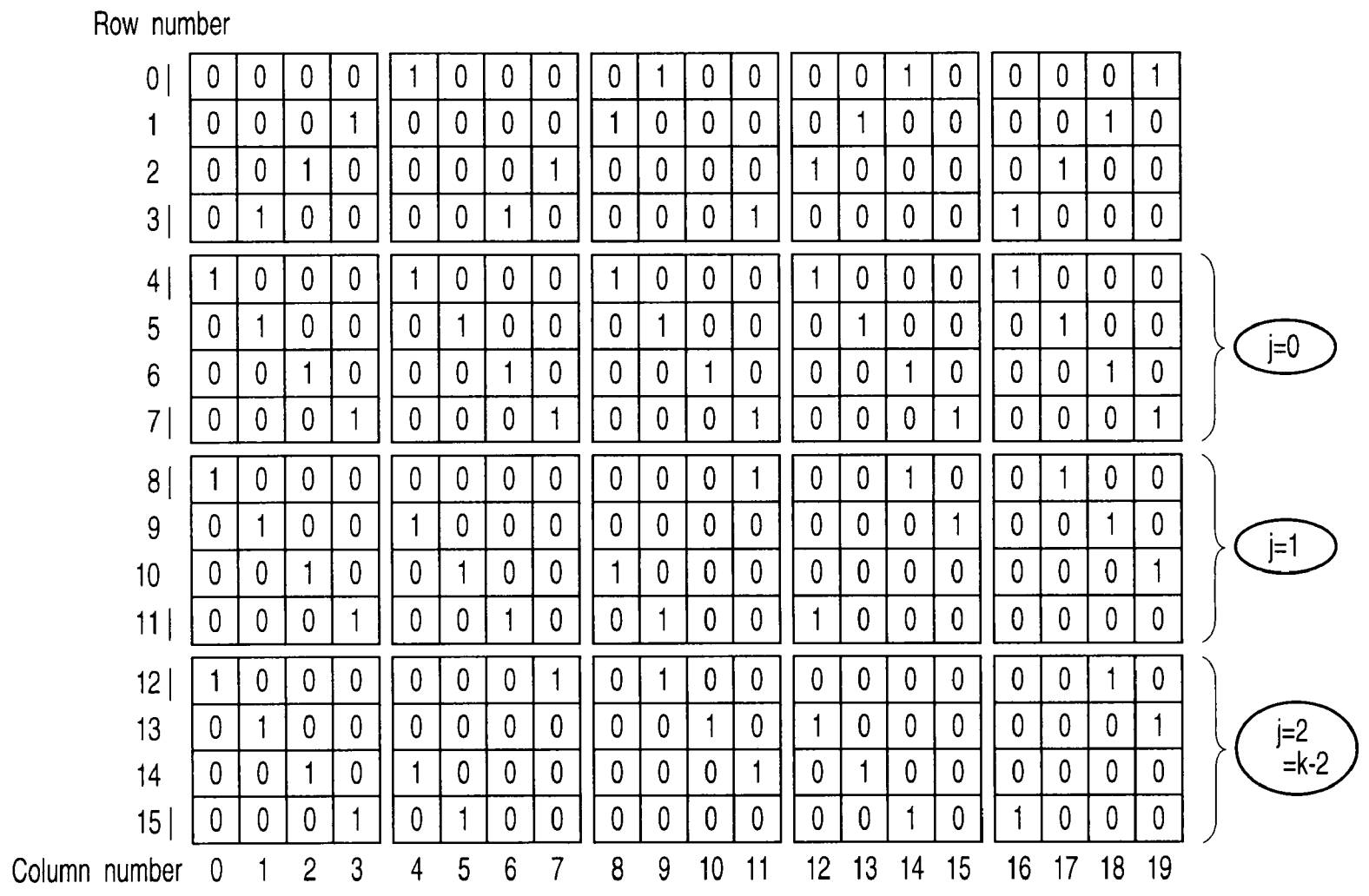

FIGS. 9, 10, 11, 12, 13, 14, and 15 are schematic diagrams illustrating a generator matrix generating operation according to the first embodiment;

FIG. 23 is a schematic diagram illustrating a variation of the first embodiment;

FIG. 24 is a schematic diagram showing a secret sharing system according to a second embodiment of the present invention;

FIG. 25 is a flowchart illustrating the operation of a sharing process according to the second embodiment;

FIG. 27 is a schematic diagram showing an example of a generator matrix according to a third embodiment of the present invention;

FIGS. 28 and 29 are schematic diagrams illustrating a generator matrix generating operation according to the third embodiment;

FIG. 33 is a schematic diagram showing an example of sharing partial data according to the third embodiment.

DETAILED DESCRIPTION OF THE INVENTION

Figure 1:
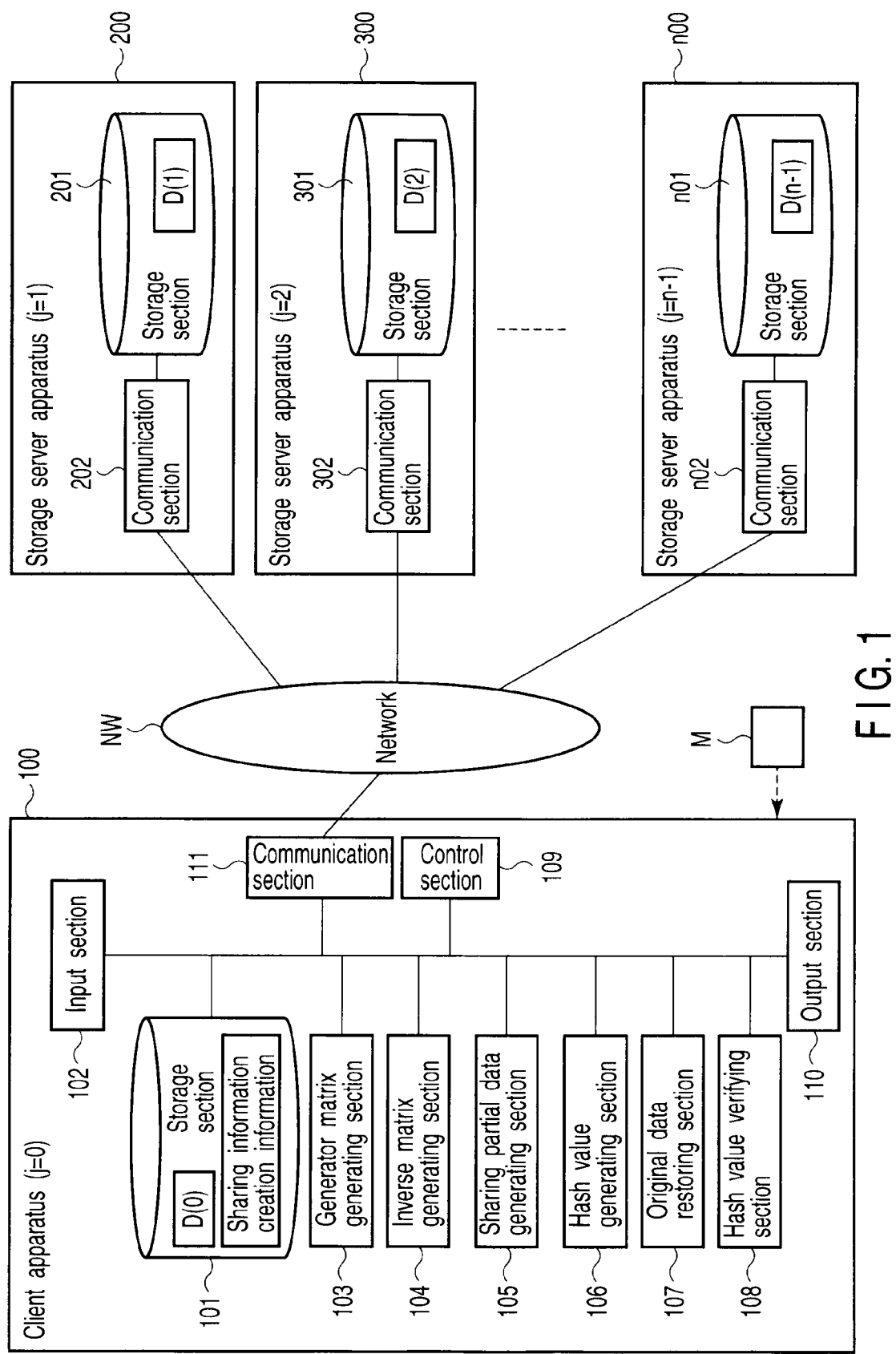
FIG. 1 is a schematic diagram showing the configuration of a secret sharing system according to a first embodiment of the present invention.

Embodiments of the present invention will be described below with reference to the drawings. Apparatuses described below can each be implemented either in a hardware configuration or in a combined configuration of a hardware source and software. As shown in FIGS. 1, 23, and 24, the software in the combined configuration is a program installed in a computer in a client apparatus as a secret sharing apparatus through a network or a storage medium M to provide functions of the secret sharing apparatus.

First Embodiment

FIG. 1 is a schematic diagram showing the configuration of a secret sharing system according to a first embodiment of the present invention. The secret sharing system has one client apparatus 100 and n−1 storage server apparatuses 200, 300, ..., n00 connected together and to the client apparatus 100 via a network NW such as the Internet.

A total of the n apparatuses 100, 200, 300, ..., n0 correspond to n members in a (k,n)-threshold scheme. In particular, n storage sections 101, 201, ..., n01 individually provided in the n apparatuses 100, 200, ..., n00 correspond to n storage devices individually possessed by the n members. A j number (row number) indicating the order of distribution of sharing information is assigned to each of the apparatuses 100, 200, 300, ..., n00. For example, j=0th is assigned to the client apparatus 100, and j=1st is assigned to the storage server apparatus 200. j=2nd is assigned to the storage server apparatus 300, ..., and j=n−1th is assigned to the storage server apparatus n00.

Here, the client apparatus 100 implements a secret sharing apparatus based on the (k,n)-threshold scheme which individually distributes n (n≧k≧4) pieces of sharing information D(0), ..., D(n−1) into which secret information S is divided to the n apparatuses 100, 200, ..., n00 and which allows the secret information S to be restored using any k of the n pieces of sharing information. The number of pieces of sharing information may be at least k. The threshold k may be at least 2. However, to be definitely distinguished from the scheme of Fujii et al. and the scheme of Kurihara et al., the present embodiment uses a threshold K of at least 4. For example, k=4 and n=4, and the secret information S is divided into n−1 (=3) pieces K(1), K(2), and K(3) described below and distributed as four pieces of sharing information D(0), D(1), D(2), and D(3). The secret information S can be restored from the sharing information D(0), D(1), D(2), and D(3).

The client apparatus 100 has a storage section 101, an input section 102, a generator matrix generating section 103, an inverse matrix generating section 104, a sharing partial data generating section 105, a hash value generating section 106, an original data restoring section 107, a hash value verifying section 108, a control section 109, an output section 110, and a communication section 111 which are connected together via a bus.

The storage section 101 is a storage device as a hardware source that is readable and writable by the control section 109. Before the distribution of the sharing information D(0) to D(n−1), the secret information S is temporarily stored in the storage section 101. Once the sharing information D(0) to D(n−1) is created, sharing information creation information is stored in the storage section 101. After the distribution of the sharing information, the j=0th piece of sharing information D(0) is stored in the storage section 101, and the secret information is removed from the storage section 101. Here, the sharing information creation information is composed of identification information j on the sharing information D(j) and destination identification information (apparatus ID, apparatus address information, and the like) on the sharing information D(j) which are associated with each other.

The input section 102 is a normal input device such as a keyboard or a mouse and has a function of inputting commands, for example, one ordering a sharing process or a decoding process to be started, and information such as the secret information S to the client apparatus 100 in accordance with an operator's operation.

The generator matrix generating section 103 has a function of generating, under the control of the control section 109, a generator matrix G of GF(2) which is made up of n column vectors each having a size of k(n−1) rows×(n−1) columns and in which any k of the n column vectors are at a full rank, as shown in an example of a (4,5)-threshold scheme with k=4 and n=5 in FIG. 2. However, the generator matrix G has a size of k(n−1) rows×n(n−1) columns. GF(2) is a finite field of order 2. The term "full rank" means that the rank obtained by subjecting a matrix to a basic transformation is full (=k(n−1)), indicating linear dependence.

Specifically, the generator matrix generating section 103 has a function of executing processes (p103-1) to (P103-10) described below.

(P103-1) A process of, when an input sharing number n and the input threshold k are stored in the storage section 101, generating a first minor matrix of n rows×(n−1) columns in which the 0th row is a zero vector and in which the (n−1) rows×(n−1) columns under the 0th row correspond to a matrix having a laterally symmetrical relationship with a unit matrix, on the basis of the sharing number n and threshold k in the storage section 101.

(P103-2) A first adjacency process of cyclically shifting each of the columns of the leftmost first minor matrix upward once to obtain a new first minor matrix of n rows×(n−1) columns and placing the first minor matrix on the left side of and adjacent to the first minor matrix not subjected to the cyclic shift yet.

(P103-3) A process of executing the first adjacency process n−1 times to generate a first submatrix of n rows×n(n−1) columns.

(P103-4) A first submatrix assigning process of assigning the 1st to n−1th rows of the first submatrix to the 0th to n−2th rows of the generator matrix G to generate a submatrix corresponding to the 0th row to n−2th row of the generator matrix G.

(P103-5) A process of generating a second minor matrix of n rows×(n−1) columns in which the 0th row is a zero vector and in which the (n−1) rows×(n−1) columns under the 0th row correspond to a unit matrix.

(P103-6) A second adjacency process of cyclically shifting the leftmost second minor matrix downward j times to obtain a new second minor matrix of n rows×(n−1) columns and placing the second minor matrix on the right side of and adjacent to the second minor matrix not subjected to the cyclic shift yet (j=0, 1, ..., k−2).

(P103-7) A second submatrix generating process of executing the second adjacency process n 1 times to generate a second submatrix of n rows×n(n 1) columns.

(P103-8) A second submatrix assigning process of assigning the 1st to n−1th rows of the second submatrix to the (n−1)(j+1)th to (n−1)(j+1)+n−2th rows of the generator matrix G to generate a submatrix corresponding to the (n−1)(j+1)th to (n−1)(j+1)+n−2th rows of the generator matrix G (j=0, 1, ..., k−2).

(P103-9) A process of, with the value of j for the second adjacency process and the second submatrix assigning process varied from an initial value 0 to a final value k−2, executing the second adjacency process, the second submatrix generating process, and the second submatrix assigning process k−1 times, while increasing the value of j by one every time the second submatrix generating process and the second submatrix assigning process are executed, (P103-10) A process of generating the generator matrix G of k(n−1) rows×n(n−1) columns using the submatrix from the 0th to n−2th rows resulting from the assignment by the first submatrix assigning process and the submatrix from the n−1th to (n−1)(k−1)+n−2th rows resulting from the assignment by the second submatrix assigning process.

The inverse matrix generating section 104 generates an inverse matrix of the generator matrix G under the control of the control section 109. For example, as shown in the example of the (4,5)-threshold scheme with k=4 and n=5 in FIG. 3, the inverse matrix generating section 104 has a function of calculating the inverse matrix (g(D(i__1))) ..., g(D(i_j)), ..., g(D(i_k)) of a submatrix (g(D(i_1)), ..., g(D(i_j)), ..., g(D(i_k)) of the generator matrix G, formed of collected k column vectors.

Here, g(D(*)) is a submatrix of the generator matrix G which is used to calculate a *th piece of sharing information D(*) and which is called a column vector. Furthermore, the expression (i_1) means any first item, the expression (i_j) means any jth object, and the expression (i_k) means any kth item. That is, i, located in the left of the parentheses and the underline, that is, "i_", denotes "any" (i in the expression "i_" is not a row number). Furthermore, for example, D(i_1) is any first D(*) and may thus be any of D(0) to D(4).

The sharing partial data generating section 105 has a function of generating, under the control of the control section 109, n(n−1) sharing partial data D(j,i) on the basis of the secret information S temporarily stored in the storage section 101, as shown in FIGS. 4 and 5 by way of example (k=4 and n=5). Specifically, the sharing partial data generating section 105 has functions (f105-1) to (f105-3) described below.

(f105-1) A function of dividing the secret information stored in the storage section 101 into n−1 pieces and assigning row numbers j ($0 \leq j \leq n-1$) from 1 to n−1 to the result of the division to generate n−1 sharing secret data K(1), ... K(j), ..., K(n−1) having the same size.

(f105-2) A function of generating (k−1)(n−1) random numbers of the same size as that of each sharing secret data and assigning row numbers h ($1 \leq h \leq k-2$) and column numbers g ($1 \leq g \leq n-1$) to the random numbers to generate random number data U(0,1), ..., U(h, g), U(k−2,n−1). The random numbers U(h, g) are independent of one another.

(f105-3) A function of calculating the product of the matrix (K(1), ..., K(j), ..., K(n−1), U(0,1), U(h, g), ..., U(k−2, n−1)) and the generator matrix G on the basis of the sharing secret data K(1), K(j), ..., K(n−1), the random number data U(0,1), U(h, g), ..., U(k−2,n−1), and the generator matrix G (the calculation is performed on GF(2)) and assigning a j×(n−1)+ith column of the calculation result to D(j,i) to calculate n(n−1) sharing partial data D(j,i) ($0 \leq j \leq n-1$ and $0 \leq i \leq n-2$).

The hash value generating section 106 has a function of, when the control section 109 inputs header information H(j) to the hash value generating section 106 via the bus, generates a hash value h(H(j)) for the header information H(j) and outputting the hash value h(H(j)) obtained to the bus under the control of the control section 109. If the header information H(j) is not verified, the hash value generating section 106 may be omitted.

The original data restoring section 107 has a function of restoring the secret information S on the basis of any k pieces of sharing information D(i_1), ..., D(i_j), ..., D(i_k) ($0 \leq i_j \leq n-1$) of n pieces of sharing information D(0) to D(n−1) distributed to the n apparatuses 100, ..., n00 under the control of the control section 109. Specifically, the original data restoring section 107 has functions (f107-1) and (f107-2) described below.

(f107-1) A function of calculating the product of the matrix (D(i_1), ..., D(i_j), ..., D(i_k)) and the inverse matrix (g(Di_1)), ..., g(D(i_j)), g(D(i_k))' on the basis of the collected k pieces of sharing information D(i_1), ..., D(i_j), ..., D(i_k) and the inverse submatrix (g(Di_1)), g(D(i_j)), ..., g(D(i_k))' of the generator matrix G and assigning the data in the ith column of the calculation result to K(i+1) to obtain sharing secret data K(1), ..., K(n−1).

(f107-2) A function of connecting restored n−1 sharing secret data K(1), ..., K(n−1) together to restore the secret information S=k(1)∥K(2)∥ ... ∥K(n−1) (∥ is a symbol representing connection).

The hash value verifying section 108 has a function of, when the control section 109 inputs the header information H(j) and hash value h(H(j)) to the hash value verifying section 108 via the bus, verifying the header information H(j) on the basis of the hash value h(H(j)) and outputting the verification result to the bus under the control of the control section 109. In this verification, the header information H(j) is determined to be valid when a hash value calculated from the header information H(j) is equal to the input hash value h(H(j)). If the header information H(j) is not verified, the hash value verifying section 108 may be omitted.

Figure 6:
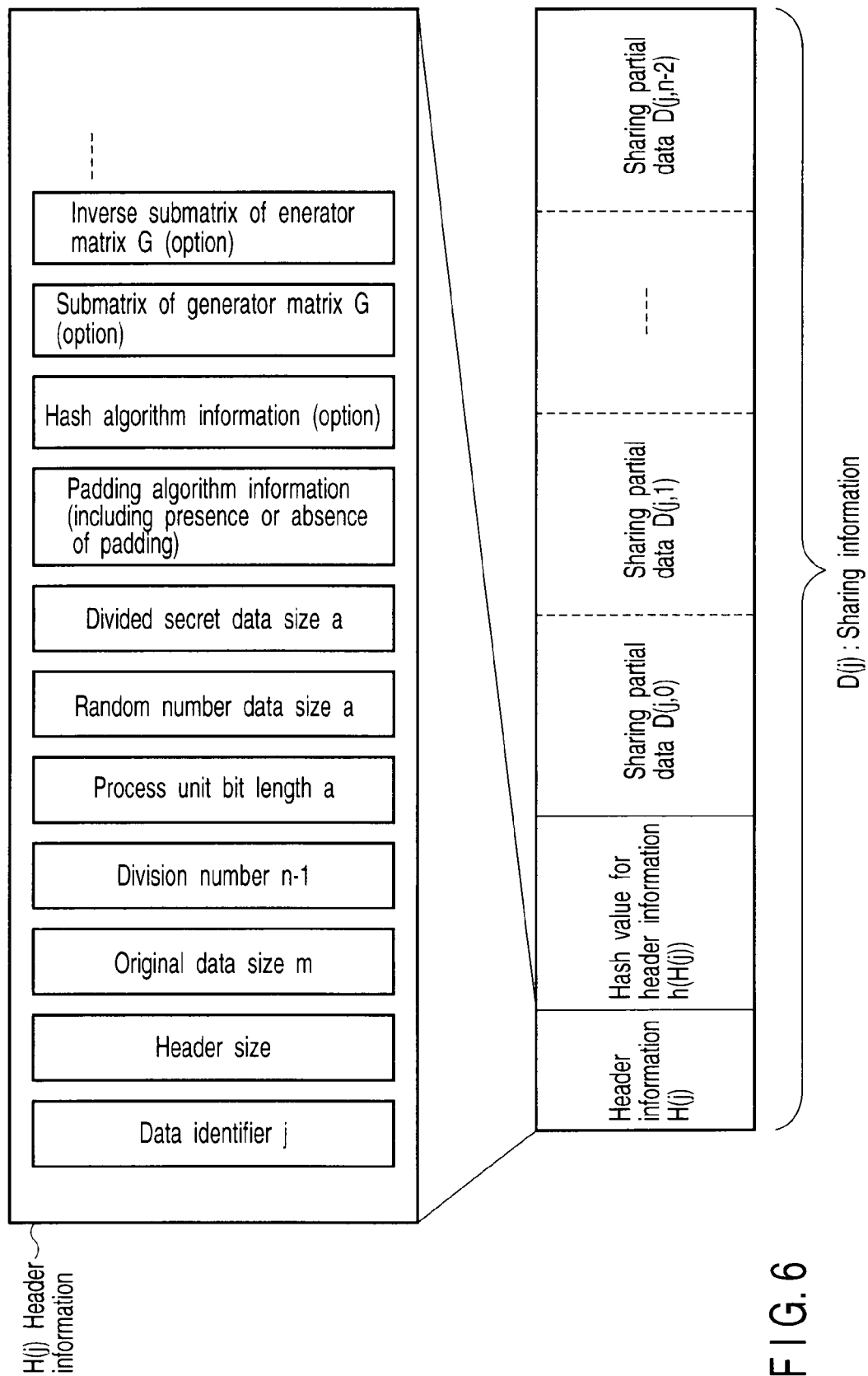
FIG. 6 is a schematic diagram showing an example of header information and sharing information according to the first embodiment.

Here, the possible header information H(j) includes a data identifier indicating the row number j, a header size indicating the size of the header, an original data size m indicating the size of the original data, a division number n−1 indicating the number of pieces into which the original secret information S is divided, a processing unit bit length a indicating a process unit bit number for the sharing partial data D(j,i), a random data size a indicating the data size of a random number R(j,i), a division data size a indicating the size of the divided secret data K(j), a padding algorithm indicating the presence or absence of padding or an algorithm, a hash algorithm information (option), the submatrix g(D(j)) of the generator matrix G (option), and the inverse submatrix (g(D(i_1)), ..., g(D(i_j)), ..., g(D(i_k))' of the generator matrix G (option) (always including g(D(j))), as shown in the upper part of FIG. 6 by way of example.

The hash algorithm information is added to calculate the hash value for the header information to ensure the originality of the header information. That is, the hash algorithm information may be added or omitted depending on security requirements or the like. However, if the system has a predetermined hash algorithm as a security requirement, the hash algorithm information may be omitted from the header information.

The data format of the sharing information D(j) is composed of the header information H(j), the hash value h(H(j)) for the header information H(j), n−1 pieces of sharing partial data D(j,0), D(j,1), ..., D(j,n−2) as shown in the lower part of FIG. 6 by way of example. Here, the hash value h(H(j)) is optional and may be omitted depending on the security requirements.

The control section 109 has a function of controlling the sections 101, 103 to 108, 110, and 111 on the basis of commands input via the input section 102 as well as flowcharts in FIGS. 7, 8, and 17 described below. The control section 109 has functions (f109-1) and (f109-2) described below.

(f109-1) A function of assigning the row number j to every n−1 pieces of sharing partial data D(j,0) to D(j,n−2) which are included in the sharing partial data generated by the sharing partial data generating section 105 and which have the same row number j, to generate n pieces of header information H(0), H(j), ..., H(n−1).

(f109-2) A function of individually distributing the n pieces of sharing information D(0), D(j), ..., D(n−1) made up of the header information H(j) and sharing partial data D(j,0) to D(j,n−2) having the same row number j, to the n apparatuses 100, 200, ..., n00 via the communication section 111. The control section 109 may encipher the sharing information D(0) to D(n−1) to be distributed in order to prevent the possible leakage of the sharing information D(0) to D(n−1).

The output section 110 is a normal output device such as a display device or a printer device. The output section 110 has a function of outputting an input screen for commands and the like, an output screen for the restored secret information S, and the like under the control of the control section 109.

The communication section 111 has a function of serving as a communication interface between the client apparatus 100 and the network NW under the control of the control section 109.

Each of the storage server apparatuses 200 to n00 will be described.

The storage server apparatuses 200 to n00 have the same configuration except for the stored sharing information D(1) to D(n−1). Thus, here, the storage server apparatus 200 with n=2 will be described as a typical example.

The storage server apparatus 200 comprises a storage section 201 and a communication section 202.

The storage section 201 is a storage device which is readable and writable by the communication section 202 and which stores the sharing information D(1) (=D(n−1) and n=2) distributed by the client apparatus 100.

The communication section 202 has a function of writing the sharing information D(1) distributed by the client apparatus 100 to the storage section 201 and a function of reading the sharing information D(1) requested by the client apparatus 100, from the storage section 201 and returning the sharing information D(1) to the client apparatus 100.

The communication section 202 may have a function of authenticating the client apparatus 100 in order to prevent the possible leakage of the sharing information D(1). In this case, the communication section 202 is configured to return the sharing information after authenticating the client apparatus 100.

In this case, the storage server apparatuses 200, 300, ..., n00 may be replaced with other client apparatuses, USB (Universal Serial Bus) memories, cellular phones, or PDA (Personal Digital Assistants), or with external HDDs (Hard Disc Drives).

If the storage server apparatuses 200, 300, ..., n00 are replaced with other client apparatuses, the storage server apparatuses 200, 300, ..., n00 may hold the functions of the sharing partial data generating section 105 or the original data restoring section 107. That is, the apparatus capable of restoring the secret information may be different from the client apparatus 100. For example, any number of the storage server apparatuses 200, 300, ..., n00 may be configured to be able to restore the secret information.

Further, in the case of sharing, the apparatus capable of restoring the secret information may also be different from the client apparatus 100. For example, any number of the storage server apparatuses 200, 300, ..., n00 may be configured to enable the distribution of sharing information.

If the storage server apparatuses 200, 300, ..., n00 are replaced with physical connection means or radio communication means such as USB memories or cellular phones, the network NW may be omitted. The above-described variation in which the storage server apparatuses 200, 300, ..., n00 are replaced with other apparatuses is also applicable to embodiments described below.

Now, description will be given of the operation of the secret sharing system configured as described above.

First, it is assumed that the sharing information D(j) obtained by dividing the secret information S for sharing according to the (k,n)-threshold scheme is distributed to n members (initial members). In this case, n must be selected to be a prime number. If the total number of members to which the sharing information is distributed is a composite number, n should be a prime number greater than the total number of members. In the description below, an example of the (k,n) threshold scheme is shown.

It is assumed that in the client apparatus 100, the secret information of bit length m is temporarily stored in the storage section 101 before the distribution of the sharing information D(0) to D(n−1).

Figure 7:
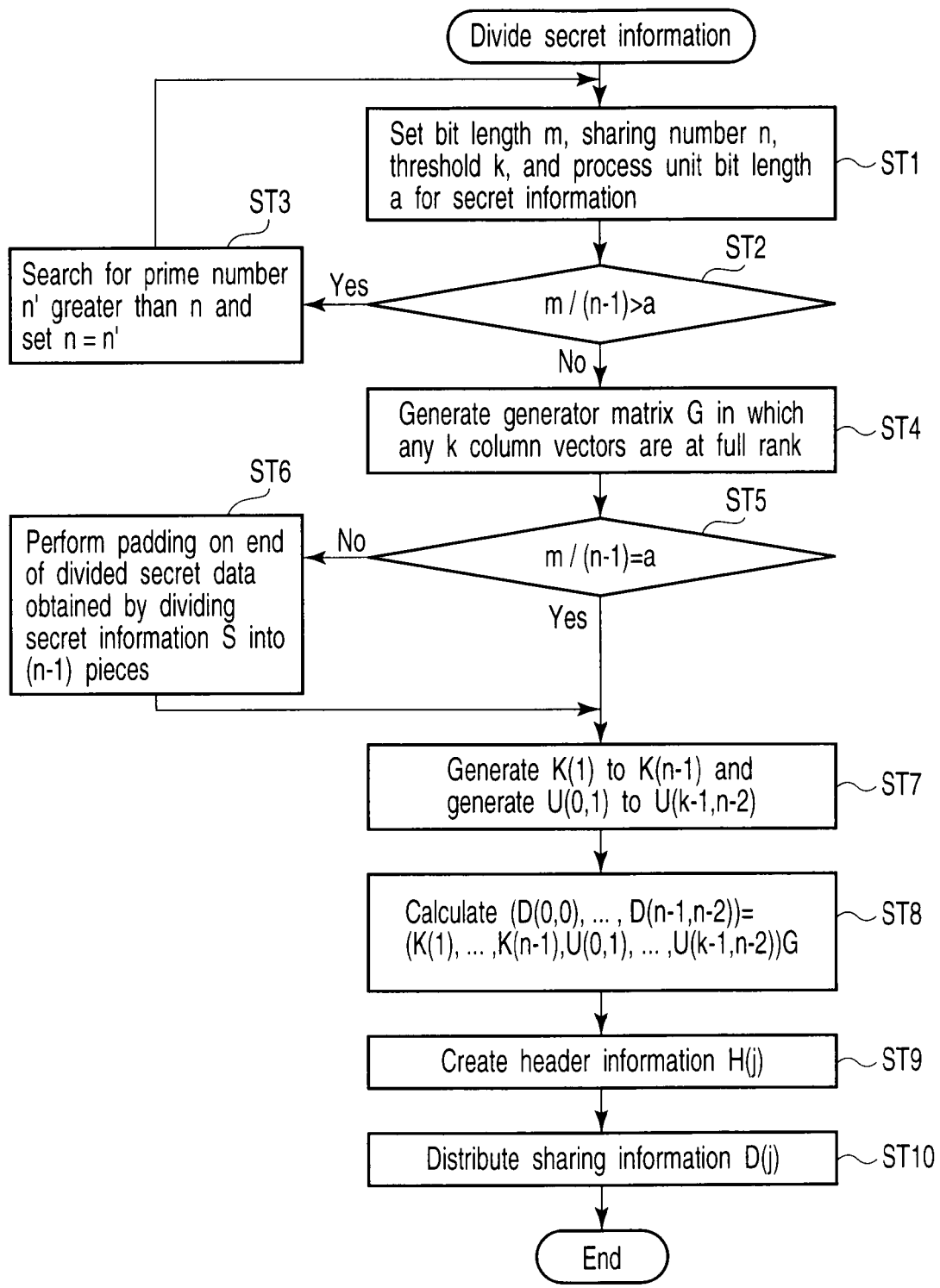
FIG. 7 is a flowchart illustrating the operation of a sharing process according to the first embodiment.

In this case, it is assumed that the operator operates the input section 102 to input a sharing process start command to the client apparatus 100 (ST1) as shown in FIG. 7.

The client apparatus 100 starts a sharing process on the basis of the start command. The control section 109 sets a sharing number n, a threshold k, the bit length m for the secret information, and a process unit bit length a (ST1). The bit length m of the secret information S may be determined from the secret information S in the storage section 101. The process unit bit length a is predetermined on the basis of the specifications of the sharing partial data generating section 105.

Subsequently, the control section 109 determines whether or not the bit length (m/(n−1)) obtained when the secret information S of the bit length m is divided into n−1 pieces exceeds the process unit bit length a (m/(n−1)>a) (ST2). If the bit length exceeds the process unit bit length a, the control section 109 searches for the prime number n' greater than n, replaces the resulting prime number n' with the sharing number n (ST3), and returns to step ST1.

On the other hand, if the determination result in step ST2 is negative (i.e. false), the control section 109 inputs the sharing number n and threshold k to the generator matrix generating section 103.

The generator matrix generating section 103 outputs the generator matrix G with the sharing number n and threshold k (any k column vectors are at a full rank, the size of the matrix G is k(n−1)×n(n−1), and the size of the column vector is k(n−1)×(n−1)) (ST4).

With reference to FIGS. 8 to 15, description will be given of the procedure of the process of generating the generator matrix G in step ST4.

Figure 8:
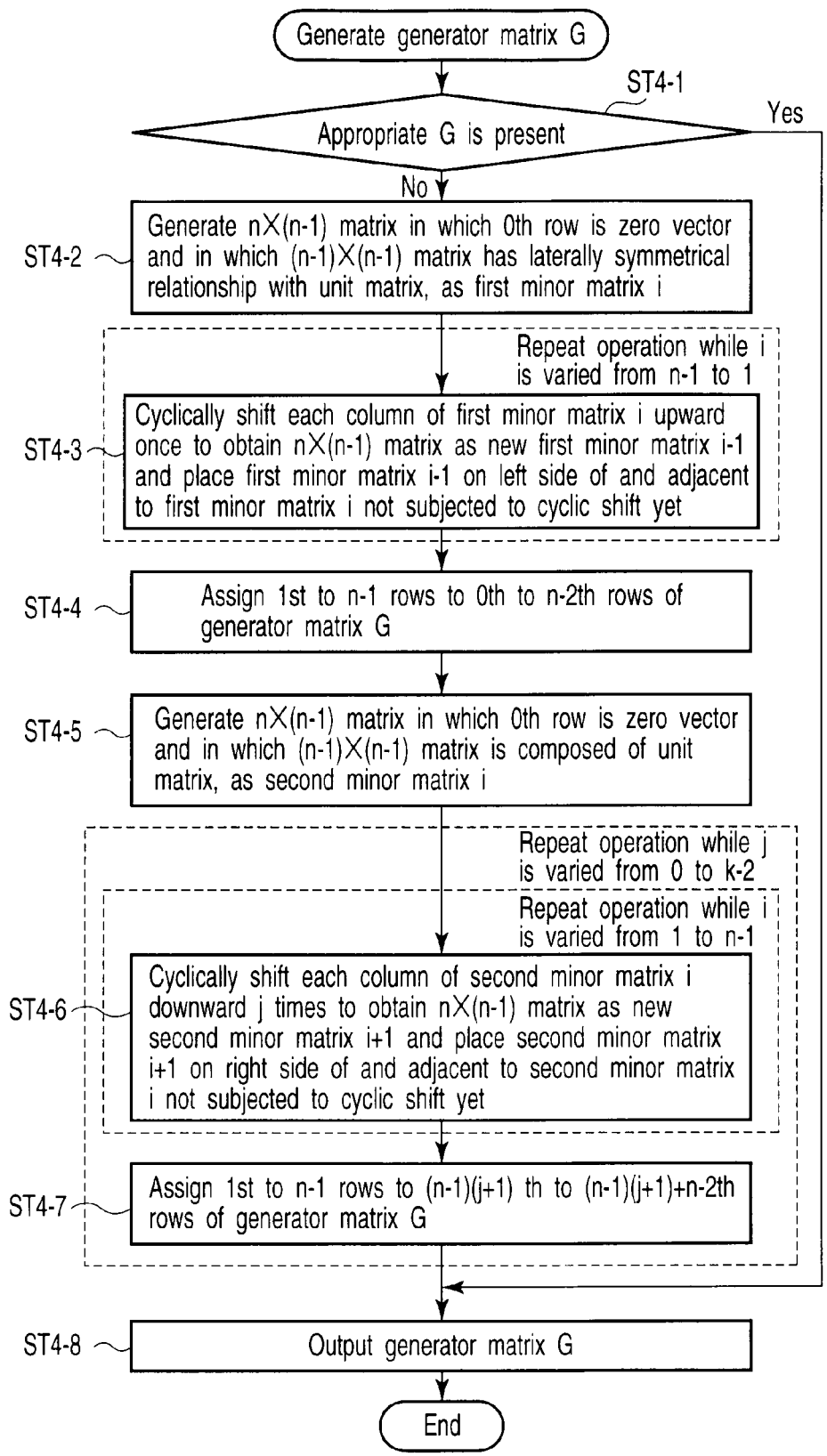
FIG. 8 is a flowchart illustrating the operation of a generator matrix generating process according to the first embodiment.

As shown in FIG. 8, the generator matrix generating section 103 searches the storage section 101 for the generator matrix G with the sharing number n and threshold k (ST4-1). If the appropriate generator matrix G is present, the generator matrix generating section 103 proceeds to ST4-8. If the appropriate generator matrix G is not present, then as shown in FIG. 9, the generator matrix generating section 103 generates a first minor matrix i of n rows×(n−1) columns configured such that the 0th row is a zero vector and such that the (n−1)×(n−1) matrix under the 0th row has a laterally symmetrical relationship with a unit matrix ((1,n−2)-element, (1,n−3)-element, (n 3,1)-element, and (n−2,0)-element are all 1, and the other elements are all 0) (ST4-2).

Figure 10:
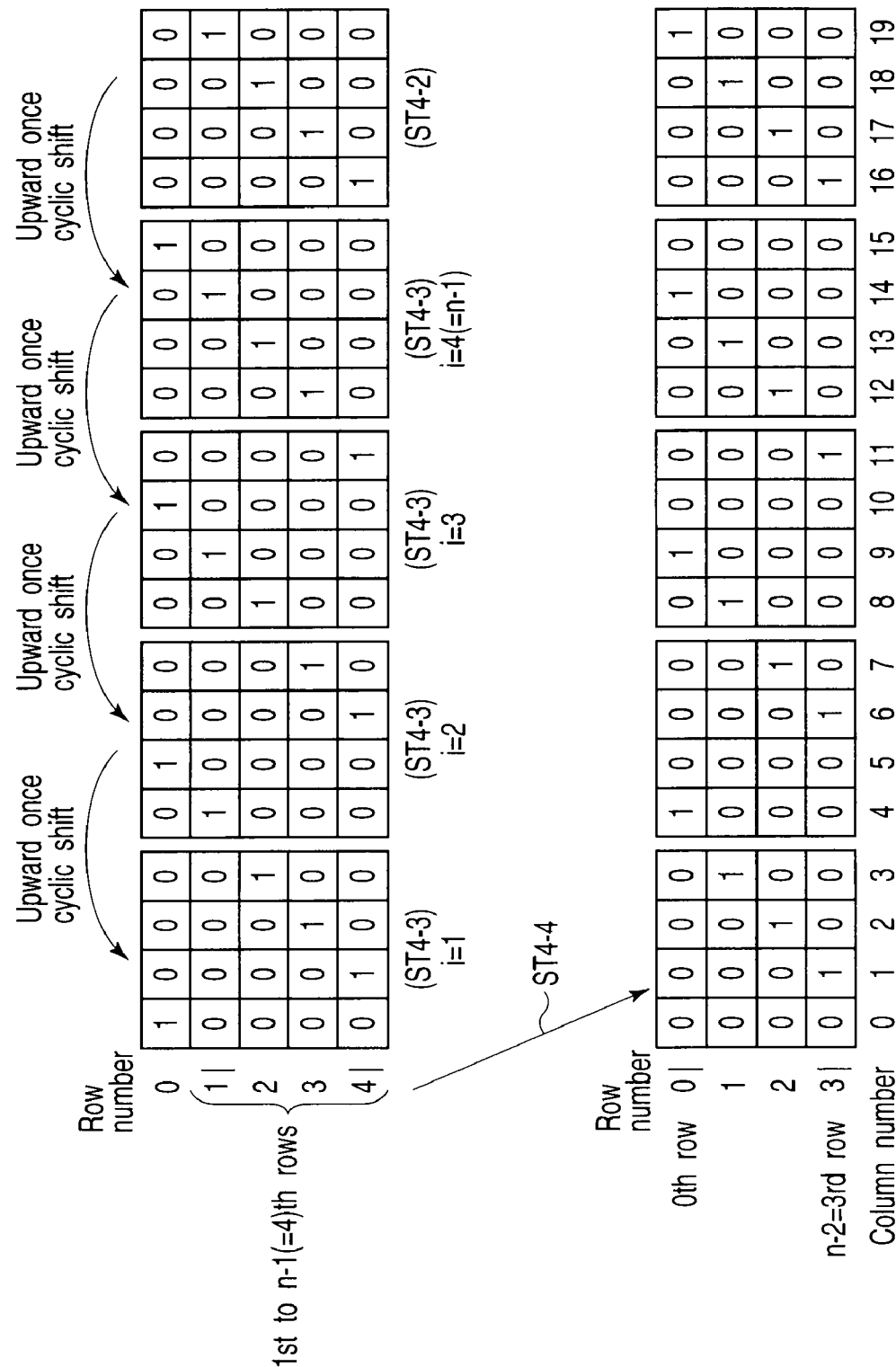

Subsequently, as shown in FIG. 10, the columns in a (leftmost) first minor matrix i are cyclically shifted upward once to obtain an n×(n−1) matrix defined as a new first minor matrix i−1 and placed on the left side of and adjacent to the first minor matrix not subjected to the cyclic shift yet (ST4-3). ST4-3 is repeated with i varied from n−1 to 1 to generate a first submatrix of n×n(n−1). The 1st to n−1th rows of the first submatrix are assigned to the 0th to n−2th rows of the generator matrix G (ST4-4). In the example of the (4,5)-threshold scheme, the submatrix from the 0th to 3rd rows of the generator matrix G is generated.

The generator matrix generating section 103 generates a second minor matrix i of n rows×(n−1) columns configured such that the 0th row is a zero vector and such that the (n−1)×(n−1) matrix under the 0th row is composed of the unit matrix (ST4-5).

Subsequently, as shown in FIGS. 12 to 15, the columns in a (rightmost) second minor matrix i are cyclically shifted downward j times to obtain an n×(n−1) matrix defined as a new second minor matrix i+1 and placed on the right side of and adjacent to the second minor matrix not subjected to the cyclic shift yet (ST4-6). ST4-6 is repeated with i varied from 1 to n−1 to generate a second submatrix of n×n(n−1). The 1st row to the n−1th row of the second submatrix are assigned to the (n−1)(j+1)th to (n−1)(j+1)+n−2th rows of the generator matrix G, and j is incremented (ST4-7). ST4-6 and ST4-7 are repeated with j varied from 0 to k−2 to generate the generator matrix G. In the example of the (4,5)-threshold scheme, the generator matrix G is configured as shown in FIG. 2.

Subsequently, the generator matrix generating section 103 outputs the resulting generator matrix G to the control section 109 (ST4-8).

The process of generating the generator matrix G is completed as described above.

After step ST4 is completed, the control section 109 inputs the secret information S, the generator matrix G, the sharing number n, and the threshold k to the sharing partial data generating section 105.

As shown in FIG. 7, the sharing partial data generating section 105 determines, on the basis of the secret information S and sharing number n, whether or not the bit number (m/(n−1)) obtained by dividing the secret information S of the bit length m into n−1 pieces is equal to the process unit bit length a (m/(n 1)=a) (ST5).

If the determination result in step ST5 is negative (i.e. false), the sharing partial data generating section 105 performs padding on sharing secret data K(n−1), that is, the last one of the n−1 divided secret data K(1) to K(n−1) into which the secret information S has been divided (data padded) (ST6). The sharing partial data generating section 105 proceeds to step ST7.

The padding need not necessarily be performed on the last divided secret data K(n−1) but may be executed on another divided secret data K(j). However, in the description of the present embodiment, the secret information S can be divided into exactly four pieces (no data padded) by way of example. Furthermore, as shown in FIG. 2, the (4,5)-threshold scheme with the sharing number n=5 and the threshold k=4 is described by way of example.

If the determination result in step ST5 indicates that the bit length is equal to the process unit bit length a, the sharing partial data generating section 105 divides the secret information S into n−1 pieces and assigns the row number j, varying from 1 to n−1 ($0 \leq j \leq n-1$), to the division result to generate the n−1 divided secret data K(1), . . . , K(j), K(n−1) having the same size (ST7). In the example of the (4,5)-threshold scheme, divided secret data K(1), K(4) are generated.

Then, the sharing partial data generating section 105 generates (k−1)(n−1) random numbers of the same size as that of each of the divided secret data and assigns the row number h ($0 \leq h \leq k-2$) and column number g $1 \leq g \leq n-1$ to the random numbers to generate the random data U(0,1), . . . , U(h, g), . . . , U(k−2,n−1) (ST7). In the example of the (4,5)-threshold scheme, random number data U (0,1), . . . , U(2, 4) are generated.

Figure 16:
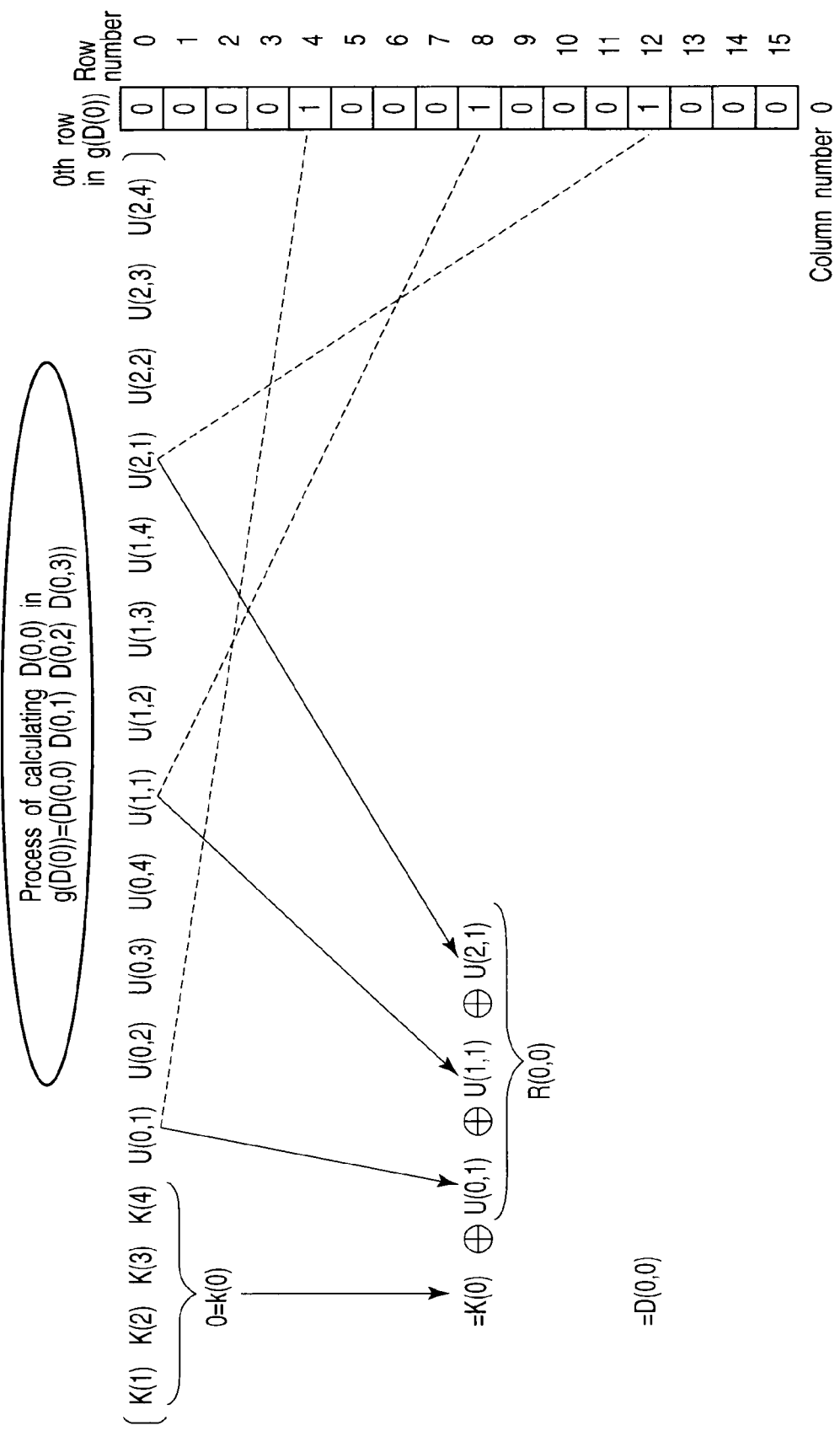
FIG. 16 is a schematic diagram illustrating the process of calculating sharing partial data according to the first embodiment.

On the basis of the divided secret data K(1), . . . , K(j), K(n−1), the random number data U(0,1), . . . , U(h, g), U(k−2,n−1), and the generator matrix G, the sharing partial data generating section 105 calculates the n(n−1) sharing partial data (D(0,0), D(j,i), D(n−1,n−2))=(K(1), K(j), K(n−1), U(0,1), . . . , U(h, g), U(k 2,n 1))G (ST8). In this case, in accordance with the process unit bit length a, if the elements of the generator matrix G are 1, the matrix is considered to be a unit matrix on an a×a GF(2). If the elements of the generator matrix G are 0, the matrix is considered to be a zero matrix on the a×a GF(2). In the example of the (4,5)-threshold scheme, 20 sharing partial data D(j,i) are generated as shown in FIGS. 4 and 5. FIG. 16 shows a process of calculating, for example, the sharing partial data D(0,0).

Subsequently, the sharing partial data generating section 105 outputs the resulting n(n−1) sharing partial data (j,i) to the control section 109.

The control section 109 assigns the row number j to every n−1 sharing partial data D(j,0) to D(j,n−2) having the same row number j to generate the n pieces of header information H(0), . . . , H(j), . . . , H(n−1) (ST9). The header information H(j) includes information such as the presence or absence of padding to K(n−1) and the size of the original data.

The control section 109 writes the sharing information D(0) to the storage section 101 and individually distributes the sharing information D(1), . . . , D(n−1) to the storage server apparatuses 200, . . . , n00 so that the n pieces of sharing information D(0), . . . , D(j), . . . , D(n−1) made up of the header information H(j) and sharing partial data D(j,0) to D(j,n−2) having the same row number j are individually distributed to the n storage sections 101, 201, . . . , n01 (ST10). In the example of the (4,5)-threshold scheme, five pieces of sharing information D(0), . . . , D(4) are distributed. The storage server apparatuses 200 to 500 stores the distributed sharing information D(1), . . . , D(4) in the storage sections 201 to 501.

The process of sharing the secret information is thus completed.

The (4,5)-threshold scheme does not necessarily require the distribution of the five pieces of sharing information D(0) to D(4). For example, it is possible to distribute the four pieces of sharing information D(0) to D(3), and when a new member is added, to distribute the remaining one piece of sharing information D(4) to the new member.

(Operation of the Restoring Process)

It is assumed that the operator operates the input section 102 to input a restoring process start command to the client apparatus 100.

Figure 17:
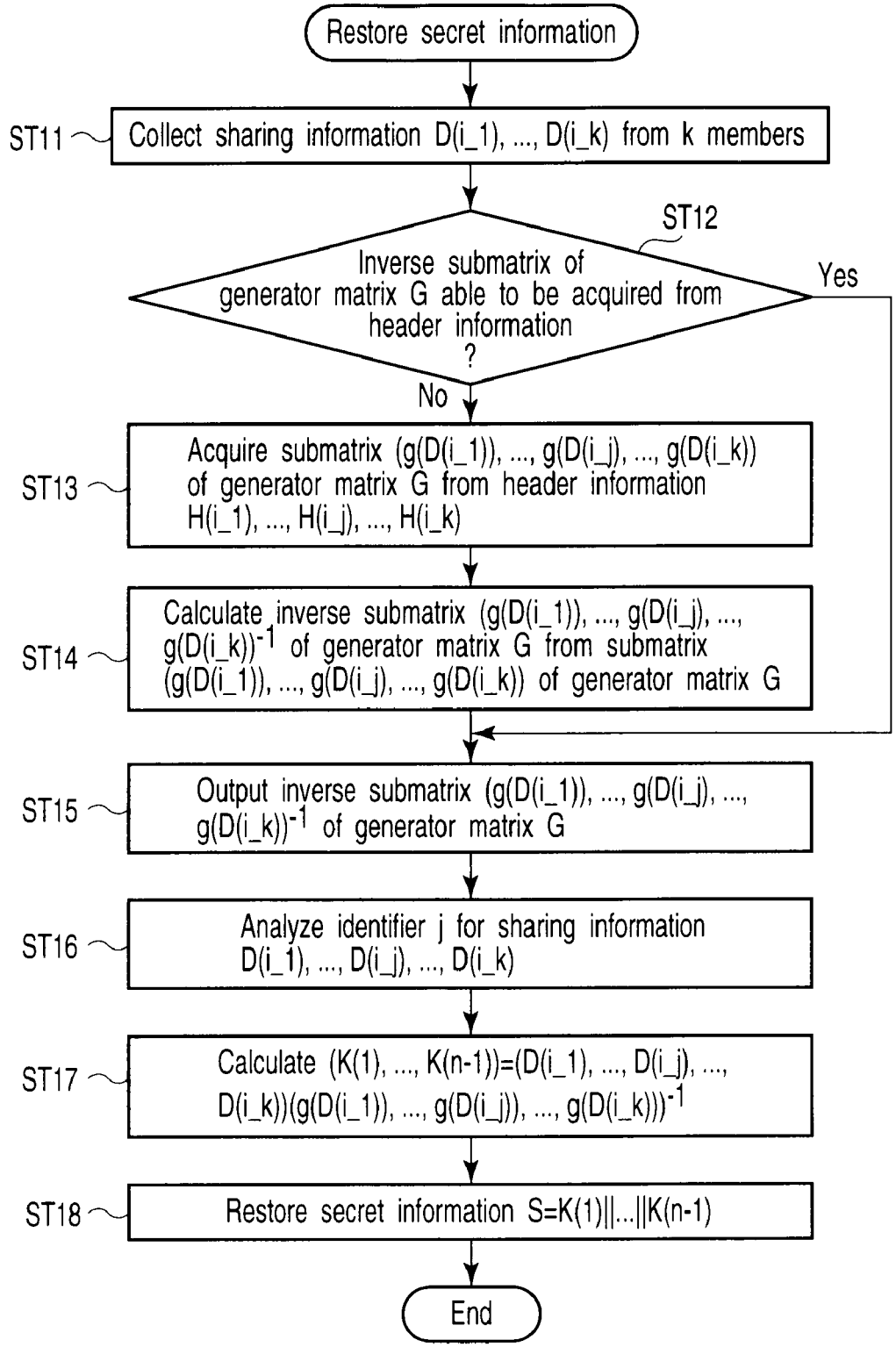
FIG. 17 is a flowchart illustrating the operation of a restoring process according to the first embodiment.
Figure 18:
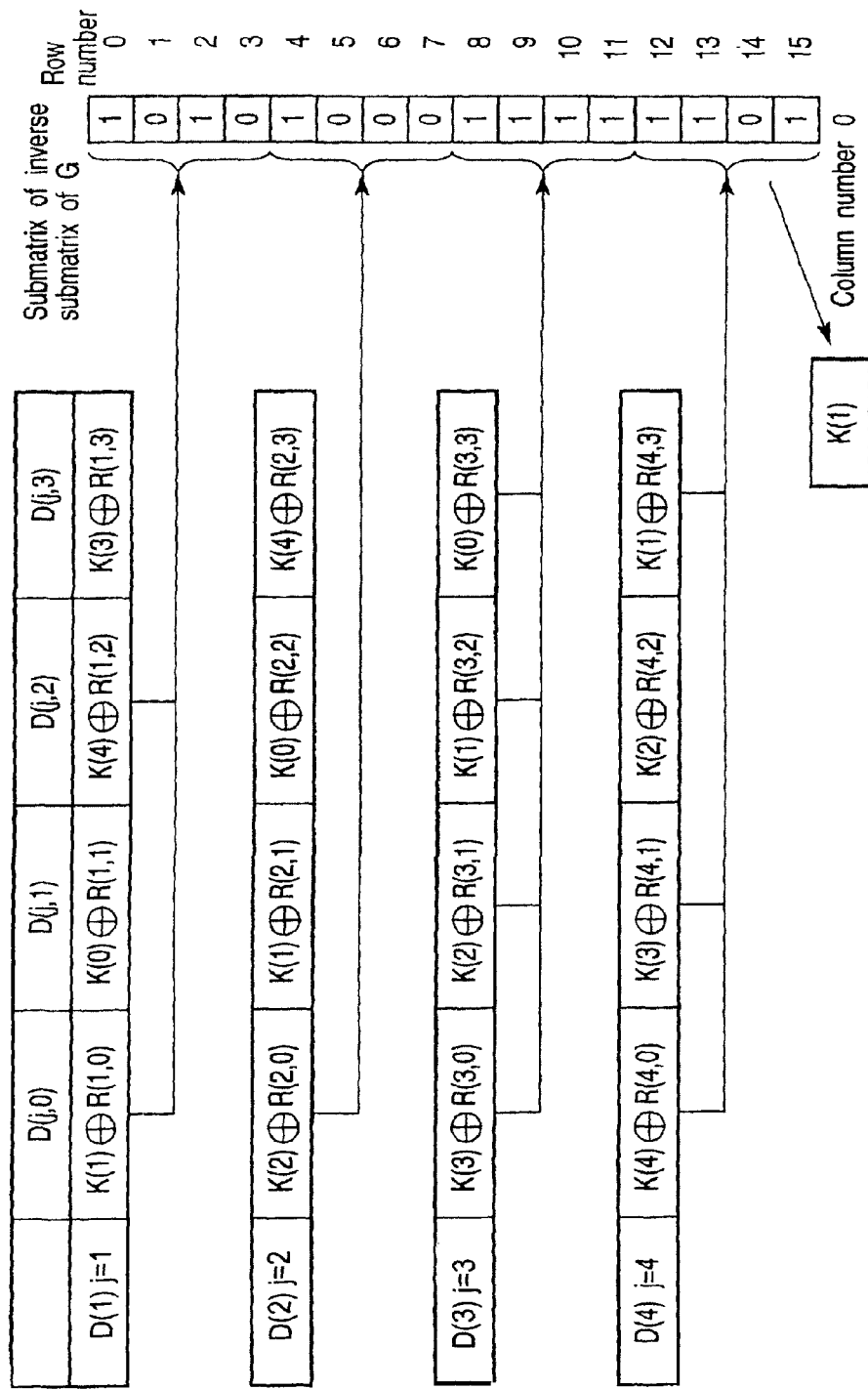
FIGS. 18, 19, 20, 21, and 22 are schematic diagrams illustrating an operation of calculating sharing secret data according to the first embodiment.
Figure 19:
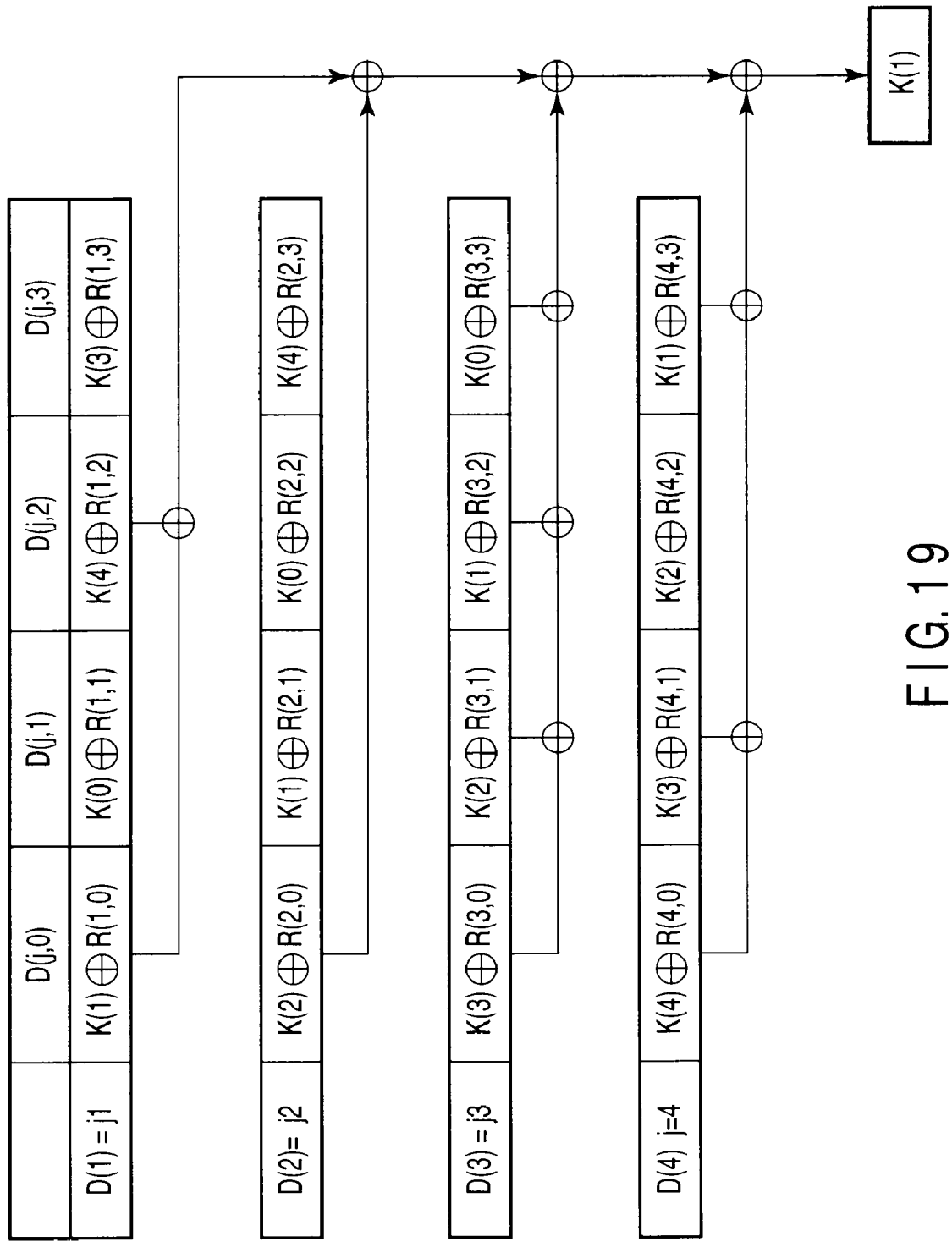
Figure 20:
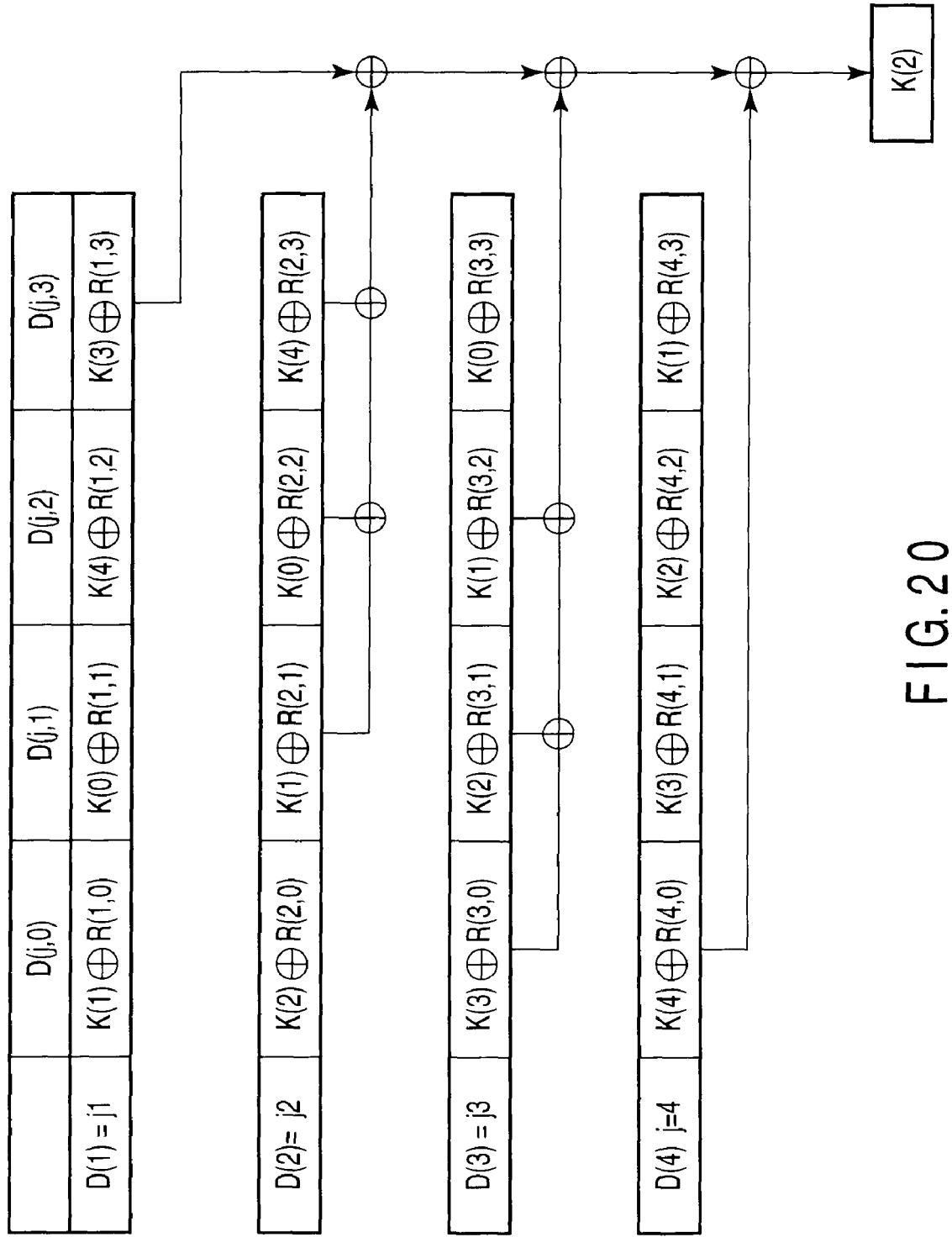
Figure 21:
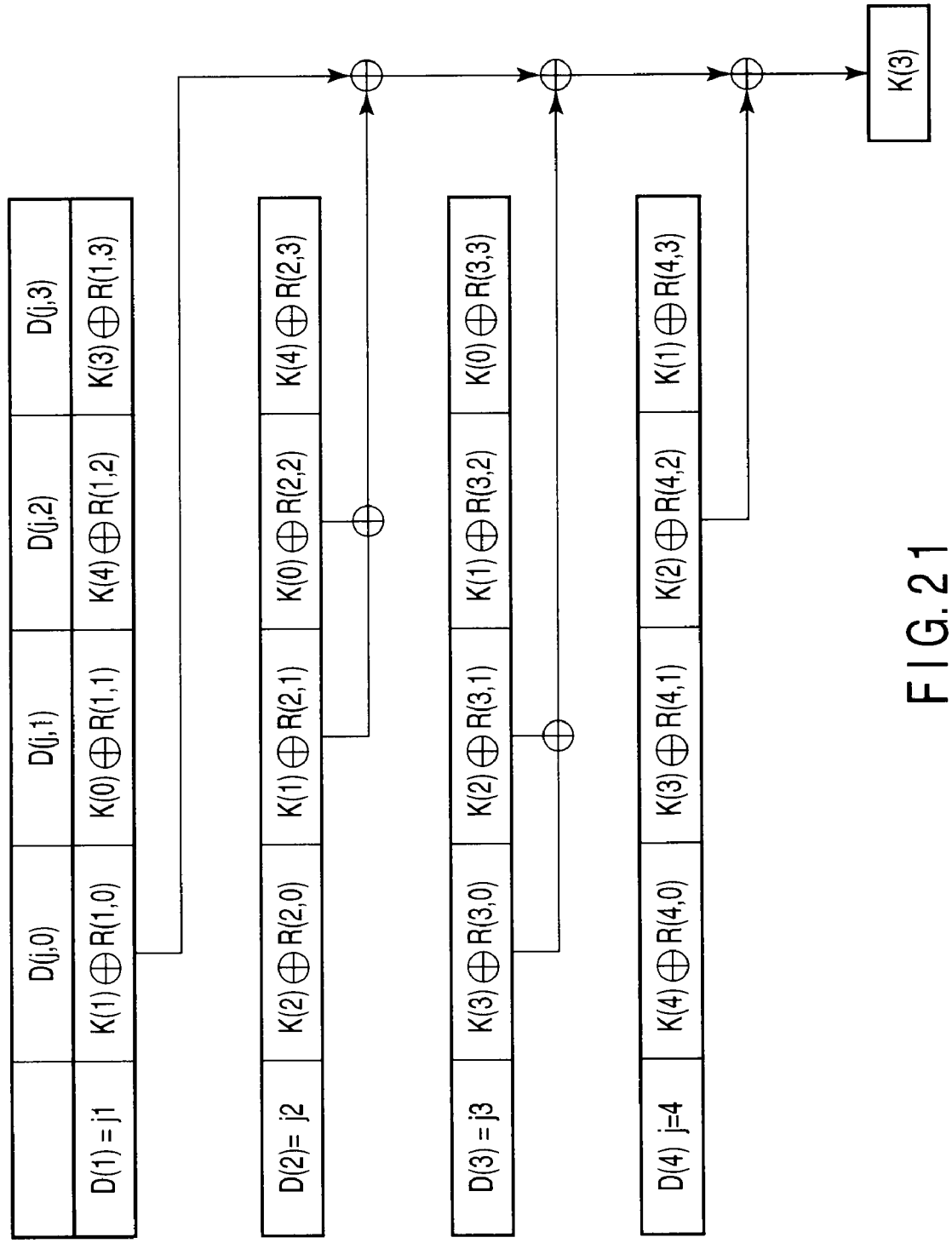
Figure 22:
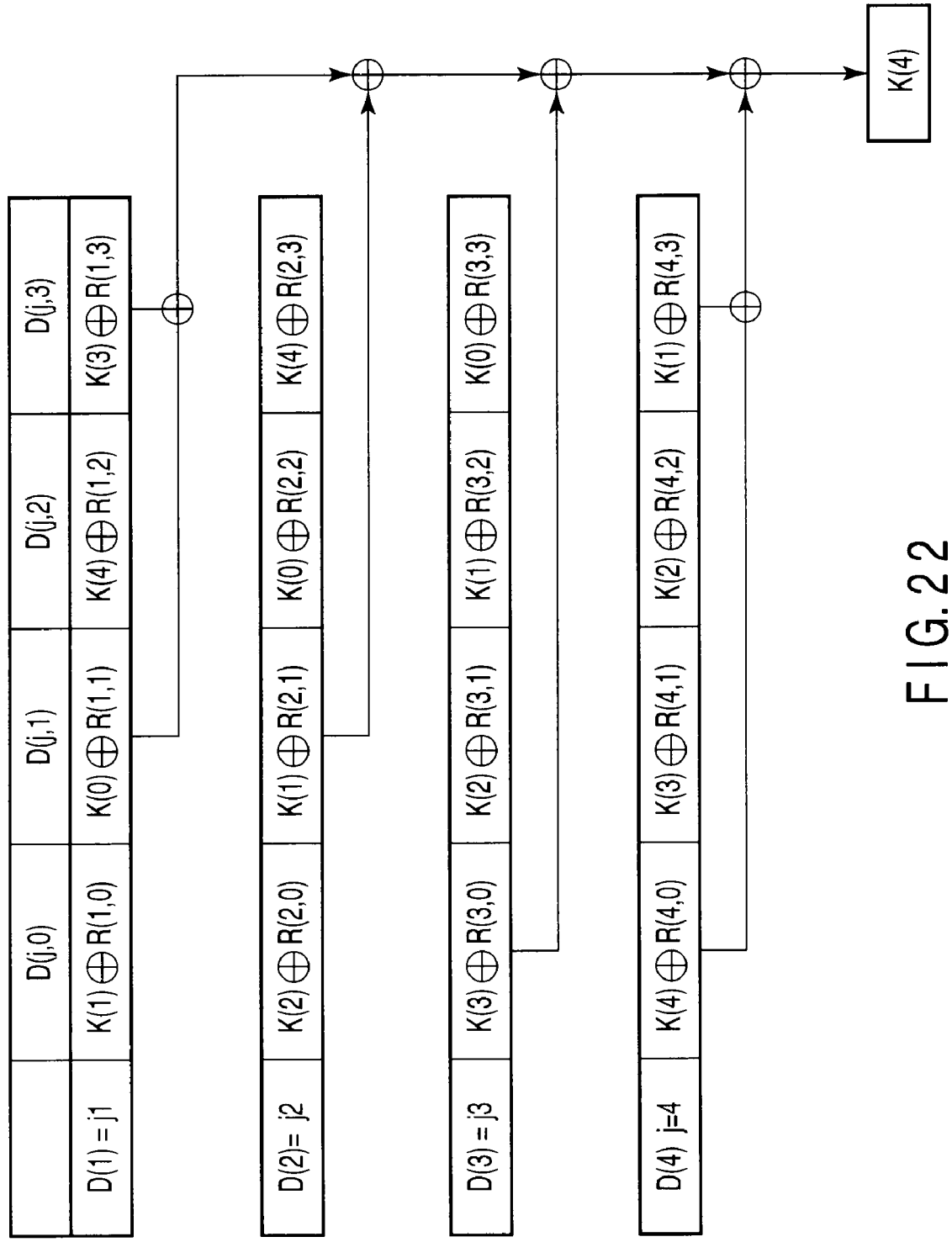

The client apparatus 100 starts a restoring process on the basis of the start command as shown in FIG. 17. The control section 109 collects any k pieces of sharing information (D(i_1), . . . , D(i_j), . . . , D(i_k) ($0 \leq i\_j \leq n-1$) included in the n pieces of sharing information distributed to the n apparatuses 100, . . . , n00 (ST11).

The control section 109 acquires the inverse submatrix (g(D(i_1), . . . , g(D(i_j), . . . , g(D(i_k))−1 of the generator matrix G from the header information H(i_1), . . . , H(i_j), . . . , H(i_k) in the sharing information D(i_1), . . . , D(i_j), . . . , D(i_k) (ST12). If the control section 109 successfully acquires the inverse submatrix, the control section 109 proceeds to ST15. If the control section 109 fails to acquire the inverse submatrix, then upon obtaining k column vectors g(D(i_1)), . . . , g(D(i_j)), . . . , g(D(i_k)) of the generator matrix G from H(i_1), . . . , H(i_j), . . . , H(i_k), the control section 109 forms and acquires the submatrix (g(D (i_1), . . . , g(D(i_j), . . . , g(D(i_k)) of the generator matrix G from the k column vectors (ST13).

Then, the control section 109 inputs the submatrix (g(D(i_1), . . . , g(D(i_j), . . . , g(D(i_k)) of the generator matrix G to the inverse matrix generating section 104.

The inverse matrix generating section 104 calculates the submatrix $(g(D(i\_1), \ldots, g(D(i\_j), \ldots, g(D(i\_k)))^{-1}$ of the generator matrix G from the submatrix (g(D(i_1), . . . , g(D(i_j), . . . , g(D(i_k)) of the generator matrix G (ST14).

In the example of the (4,5)-threshold scheme, a submatrix ((g(D(1)), g(D(2)), g(D(3)), g(D(4))) of the generator matrix G corresponding to the sharing information D(1), D(2), D(3), D(4) is as shown in FIG. 2. A submatrix (g(D(1)), g(D(2)), g(D(3)), g(D(4)))−1 of the generator matrix G corresponding to the sharing information D(1), D(2), D(3), D(4) is as shown in FIG. 3.

The inverse matrix generating section 104 outputs the inverse submatrix $(g(D(i\_1)), \ldots, g(D(i\_j)), \ldots, g(D(i\_k))^{-1}$ of the generator matrix G (ST15).

The control section 109 inputs the inverse submatrix $(g(D(i\_1)), \ldots, g(D(i\_j)), \ldots, g(D(i\_k))^{-1}$ of the generator matrix G and the sharing information D(i_1), . . . , D(i_j), . . . , D(i_k) to the original data restoring section 107.

The original data restoring section 107 performs analysis to confirm the sharing information D(i_1), . . . , D(i_j), . . . , D(i_k) on the basis of the header information H(i_1), . . . , H(i_j), . . . , H(i_k) in the sharing information D(i_1), . . . , D(i_j), D(i_k) as shown in FIG. 17 (ST16). In the example of the (4,5)-threshold scheme, for example, the sharing information D(1), D(2), D(3), (D4) is confirmed.

The original data restoring section 107 calculates the product of the matrix (D(i_1), . . . , D(i_j), . . . , D(i_k)) made up of the sharing information and the inverse submatrix (g(D(i_1), . . . , g(D(i_j), . . . , g(D(i_k))−1 of the generator matrix G (ST17). In this case, in accordance with the process unit bit number length a, if the elements of the generator matrix G are 1, the matrix is considered to be a unit matrix on the axa GF(2). If the elements of the generator matrix G are 0, the matrix is considered to be a zero matrix on the axa GF(2).

Then, the original data restoring section 107 assigns the data in an i+1th column of the calculation result to K(i) to calculate the divided sharing data K(1), . . . , K(n−1). In the example of the (4,5)-threshold scheme, if the secret information is restored from the sharing information D(1), D(2), D(3), D(4), divided secret data K(1), K(2), K(3), K(4) are calculated as shown in FIGS. 18 to 22.

The control section 109 removes padded data or the like, if any, from the divided secret K(1), . . . , K(n−1) on the basis of the header information H(i) and H(j).

Subsequently, the control section connects the divided secret data K(1), . . . , K(n−1) together to restore the secret information S=K(1)∥K(2)∥ . . . ∥K(n−1) (ST18). In this example, secret information S=K(1)∥K(2)∥ . . . ∥K(4).

As described above, the present invention is configured to use the generator matrix G to generate the sharing partial data to enable the processes of sharing and restoring the secret information to be executed at a very high speed using the exclusive OR, allowing the (k,n) threshold scheme with the threshold of at least 4 to be implemented without using polynomial interpolation.

Furthermore, in the description of the present embodiment, the threshold is at least 4 in order to definitely distinguish the present embodiment from the scheme of Fujii et al. and the scheme of Kurihara et al. Of course, the present embodiment may be implemented even when the threshold is 2 or 3. Thus, the present embodiment does not limit the sharing number n or the threshold k and is thus widely applicable to various systems.

Additionally, the sharing and restoring processes according to the present embodiment are executed only by XOR without the need for polynomial interpolation. Thus, the present embodiment not only enables the processes to be executed at a high speed but is also suitable for handling a large volume of data. Therefore, the present embodiment advantageously allows even low-specification instruments to perform secret sharing.

In the description of the present embodiment, the generator matrix generating section 103 generates the generator matrix G, and the inverse matrix generating section 104 generates the inverse matrix. However, the present invention is not limited to this. Provided that the sharing number n and the threshold k are known, the present embodiment may be varied so that a matrix storage section 112 is provided in place of the generator matrix generating section 103 and the inverse matrix generating section 104 as a readable/writable storage device in which the generator matrix G and the inverse matrix of G are pre-stored as shown in FIG. 23. This variation still allows the (k,n)-threshold scheme to be implemented using the generator matrix G and the inverse matrix.

Similarly, of course, the present embodiment may be varied so that the generator matrix G and the inverse matrix of G are pre-stored in the matrix storage section 112 for each combination of the sharing number n and the threshold k and so that the input values of n and k are used as retrieval keys to read the data on the generator matrix G and the inverse matrix of G from the matrix storage section 112.

Second Embodiment

FIG. 24 is a schematic diagram showing the configuration of a secret sharing system according to a second embodiment of the present invention.

The present embodiment is a variation of the first embodiment comprising a secret sharing system based on the (K,n) threshold (k,n)-threshold scheme to enable sharing to be performed in accordance with a sharing algorithm. In this case, the above-described generator matrix generating section 103 and the inverse matrix generating section 104 are omitted. Furthermore, the functions of the sharing partial data generating section 105a and the control section 109a are changed.

A sharing partial data generating section 105a has a function of generating, under the control of a control section 109a, n(n−1) sharing partial data D(j,i) on the based of the secret information temporarily stored in the storage section 101 as shown in FIGS. 4 and 5 by way of example (k=4 and n=5). Specifically, the sharing partial data generating section 105a has functions (f105a-1) to (f105a-6) described below.

(f105a-1) A function of dividing the secret information stored in the storage section 101 into n−1 pieces and assigning the row number j, varying from 1 to n−1 (1≦j≦n−1), to the division result to generate n−1 divided secret data K(1), . . . , K(j), . . . , K(n−1) having the same size.

(f105a-2) A function of creating zero value data of the same size as that of each divided secret data and assigning the row number j=0 to the creation result to generate divided secret data K(0).

(f105a-3) A function of creating k−1 zero value data each of the same size as that of each divided secret data and assigning the row number h (0≦h≦k−2) and the column number g=0 to the zero value data to generate random number data U(0,0), . . . , U(h, 0), U(k−2,0).

(f105a-4) A function of generating k−1 random numbers each of the same size as that of each divided secret data and assigning the row number h (0≦h≦k−2) and the column number g (1≦g≦n−1) to the random numbers to generate random number data U(0,1), . . . , U(h, g), . . . , U(k−2,n−1). The random numbers U(h, g) have different values.

(f105a-5) A function of calculating n×(n−1) random number data R(j,i)=U (0, h×j+i+1(mod n)) (+) . . . (+)U (h, h×j+i+1(mod n)) (+) . . . (+)U (k−1, h×j+i+1(mod n)) on the basis of the random number data U(0,0), U(h, g), . . . , U(k−2,n−1) ((+) is a symbol representing exclusive OR).

For U(h, h×j+i+1(mod n))=U(h,0) (=0), the term U(h,0) need not necessarily be calculated. For example, U(0, 3)(+)U(1, 4)(+)U(2,0) may be changed to U(0, 3)(+)U(1, 4). Thus, for U(h,0) (=0), the term U(g,0) need not be calculated. This also applies to the remaining parts of the specification.

(f105a-6) A function of calculating n(n−1) sharing partial data $D(j,i)=K(j−1(\mod n))(+)R(j,i)$ on the basis of the sharing partial data $K(0), K(1), \ldots, K(j), K(n−1)$ and the random number data $R(0,0), R(i,j), \ldots, R(n−1,n−2)$ ((+) is a symbol representing exclusive OR).

For $K(j−i(\mod n))=K(0)$ (=0), the term K(0) need not necessarily be calculated. For example, $D(j,i)=R(j,i)$ may be calculated with the term K(0) omitted. Thus, for K(0) (=0), the term K(0) need not be calculated. This also applies to the remaining parts of the specification.

The control section 109a has a function of controlling the sections 101, 105a to 108, 110, and 111 on the basis of commands input via the input section 102 as well as flowcharts in FIGS. 25 and 26 described below.

Now, description will be given of the operation of the secret sharing system configured as described above. Here, the (k,n)-threshold method will be described by way of example.

First, it is assumed that the sharing information D(j)—obtained by dividing the secret information S for sharing according to the (k,n)-threshold scheme—is distributed to n members (initial members). In this case, n must be selected to be a prime number. Consequently, to distribute the sharing information to the n members, the secret sharing scheme is applied to n', which is greater than n, and which is a prime number. In the description below, an example of the (k,n)-threshold scheme is shown.

(Operation of the Sharing Process)

It is assumed that in the client apparatus 100, the secret information of the bit length m is temporarily stored in the storage section 101 before the distribution of the sharing information D(0) to D(n−1).

In this case, it is assumed that the operator operates the input section 102 to input the sharing process start command to the client apparatus 100 as shown in FIG. 25.

The client apparatus 100 starts a sharing process on the basis of the start command. The control section 109a sets the bit length m for the secret information, the sharing number n, and the process unit bit length a (ST21). The bit length m of the secret information S may be determined from the secret information S in the storage section 101. The process unit bit length a is predetermined on the basis of the specifications of the sharing partial data generating section 105.

Subsequently, the control section 109a determines whether or not the bit length (m/(n−1)) obtained when the secret information S of the bit length m is divided into n−1 pieces exceeds the process unit bit length a (m/(n−1)>a) (ST22). If the bit length exceeds the process unit bit length a, the control section 109 searches for the prime number n' greater than n, replaces the resulting prime number n' with the sharing number n (ST23), and returns to step ST21.

On the other hand, if the determination result in step ST22 is negative (i.e. false), the control section 109a inputs the secret information S and the sharing number n to the sharing partial data generating section 105a.

The sharing partial data generating section 105a determines, on the basis of the secret information S and the sharing number n, whether or not the bit length (m/(n−1)) obtained when the secret information S of the bit length m is divided into n−1 pieces is equal to the process unit bit length a (m/(n−1)=a) (ST24).

If the determination result in step ST24 is negative (i.e. false), the sharing partial data generating section 105a performs padding on the sharing secret data K(n−1), that is, the last one of the n−1 divided secret data K(1) to K(n−1) into which the secret information S has been divided (data padded) (ST25). The sharing partial data generating section 105a proceeds to step ST26.

The padding need not necessarily be performed on the last divided secret data K(n−1) but may be executed on another divided secret data K(j). However, in the description of the present embodiment, the secret information S can be divided into exactly four pieces (no data padded) by way of example. Furthermore, as shown in FIGS. 4 and 5, the (4,5)-threshold scheme with the sharing number n=5 and the threshold k=4 is described by way of example.

Figure 26:
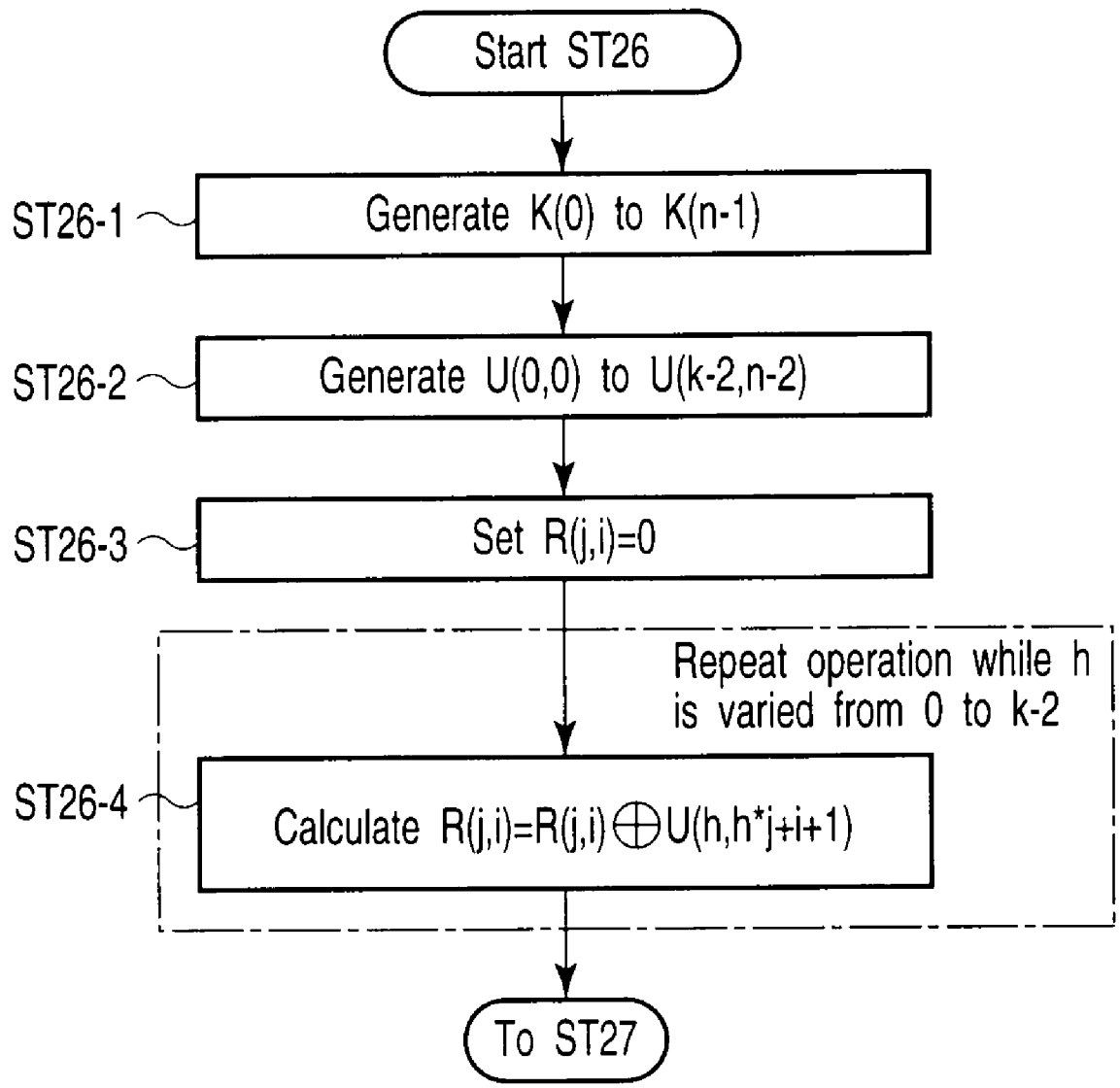
FIG. 26 is a flowchart illustrating an operation of generating divided secret data and random numbers according to the second embodiment.

If the determination result in step ST24 indicates that the bit length is equal to the process unit bit length a, sharing partial data generating section 105a starts step ST26 as shown in FIG. 26.

That is, the sharing partial data generating section 105a divides the secret information S into n−1 pieces and assigns the row number j, varying from 1 to n−1 ($0 \leq j \leq n-1$), to the division result to generate the n−1 divided secret data $K(1), \ldots, K(j), \ldots, K(n−1)$ having the same size. In the example of the (4,5)-threshold scheme, divided secret data K(1), K(4) are generated.

Furthermore, the sharing partial data generating section 105a creates k−1 zero value data of the same size as that of each divided secret data and assigns the row number j=0 to the creation result to generate the divided secret data K(0) (ST26-1).

Moreover, the sharing partial data generating section 105a creates k−1 zero value data each of the same size as that of each divided secret data and assigns the row number h ($0 \leq h \leq k-2$) and the column number g=0 to generate random number data $U(0,0), U(h, 0), \ldots, U(k−2,0)$.

The sharing partial data generating section 105a then creates (k−1)(n−1) random numbers each of the same size as that of each divided secret data and assigns the row number h ($0 \leq h \leq k-2$) and the column number g ($1 \leq g \leq n-1$) to generate random number data $U(0,1), U(h, g), \ldots, U(k−2,n−1)$ (ST26-2).

On the basis of the random number data $U(0,0), \ldots, U(h,g), \ldots, U(k−2,n−1)$, the sharing partial data generating section 105a sets the random data $R(j,i)=0$ (ST26-3) and repeats the operation while varying h from 0 to k 2 to generate n(n−1) random number data $R(j,i)=U(0,h \times j+i+1(\mod n))(+) \ldots (+)U(h,h \times j+i+1(\mod n))(+)(+)U(k−1,h \times j+i+1(\mod n))$ (ST26-4). In the example of the (4,5)-threshold scheme, random number data $R(0,0), \ldots, R(4,3)$ are generated.

Then, on the basis of the divided secret data $K(0), K(1), \ldots, K(j), \ldots, K(n−1)$ and the random number data $R(0,0), \ldots, R(j,i), \ldots, R(n−1,n−2)$, the sharing partial data generating section 105a calculates n(n−1) sharing partial data $D(j,i)=K(j−i(\mod n))(+)R(j,i)$ (ST27). The calculation is performed by repeating the operation while varying the row number j from 0 to n−1 and the column number i from 0 to n−2. In the example of the (4,5)-threshold scheme, 20 sharing partial data D(j,i) are generated as shown in FIGS. 4 and 5.

Subsequently, the sharing partial data generating section 105a outputs the sharing partial data D(j,i) in the resulting n(n−1) sharing partial data to the control section 109a.

The control section 109a assigns the row number j to every n−1 sharing partial data D(j,0) to D(j,n−2) having the same row number j to generate n pieces of header information $H(0), \ldots, H(j), \ldots, H(n−1)$ (ST28). The header information H(j) includes the presence or absence of padding to K(n−1), the size of the original data, and the like.

The control section 109a writes the sharing information D(0) to the storage section 101 and individually distributes the sharing information D(1), ... , D(n−1) to the storage server apparatuses 200, ... , n00 so that the n pieces of sharing information D(0), ... , D(j), ... , D(n−1) made up of the header information H(j) and sharing partial data D(j,0) to D(j,n−2) having the same row number j are individually distributed to the n storage sections 101, 201, ... , n01 (ST29).

In the example of the (4,5)-threshold scheme, five pieces of sharing information D(0), ... , D(4) are distributed. The storage server apparatuses 200 to 500 stores the distributed sharing information D(1), D(4) in the storage sections 201 to 501.

The process of sharing the secret information is thus completed.

In the (4,5)-threshold scheme, the number of pieces of sharing information distributed need not necessarily be five. For example, it is possible to distribute the four pieces of sharing information D(0) to D(3), and when a new member is added, to distribute the remaining one piece of sharing information D(4) to the new member.

As described above, the present embodiment is configured to use the algorithm achieving results similar to those achieved by the generator matrix G according to the first embodiment to generate the sharing partial data. The present embodiment thus enables the process of sharing secret data to be executed at a high speed using exclusive OR to allow the implementation of the (k,n)-threshold scheme that can be performed at a high speed, without using polynomial interpolation.

That is, the present embodiment exerts effects similar to those of the first embodiment without using the generator matrix G.

Third Embodiment

Now, description will be given of a secret sharing system according to a third embodiment of the present invention.

The present embodiment is a variation of the first embodiment, and relates to a generator matrix G with a bit pattern different from that according to the first embodiment as well as a sharing process utilizing this generator matrix G.

Figure 28:
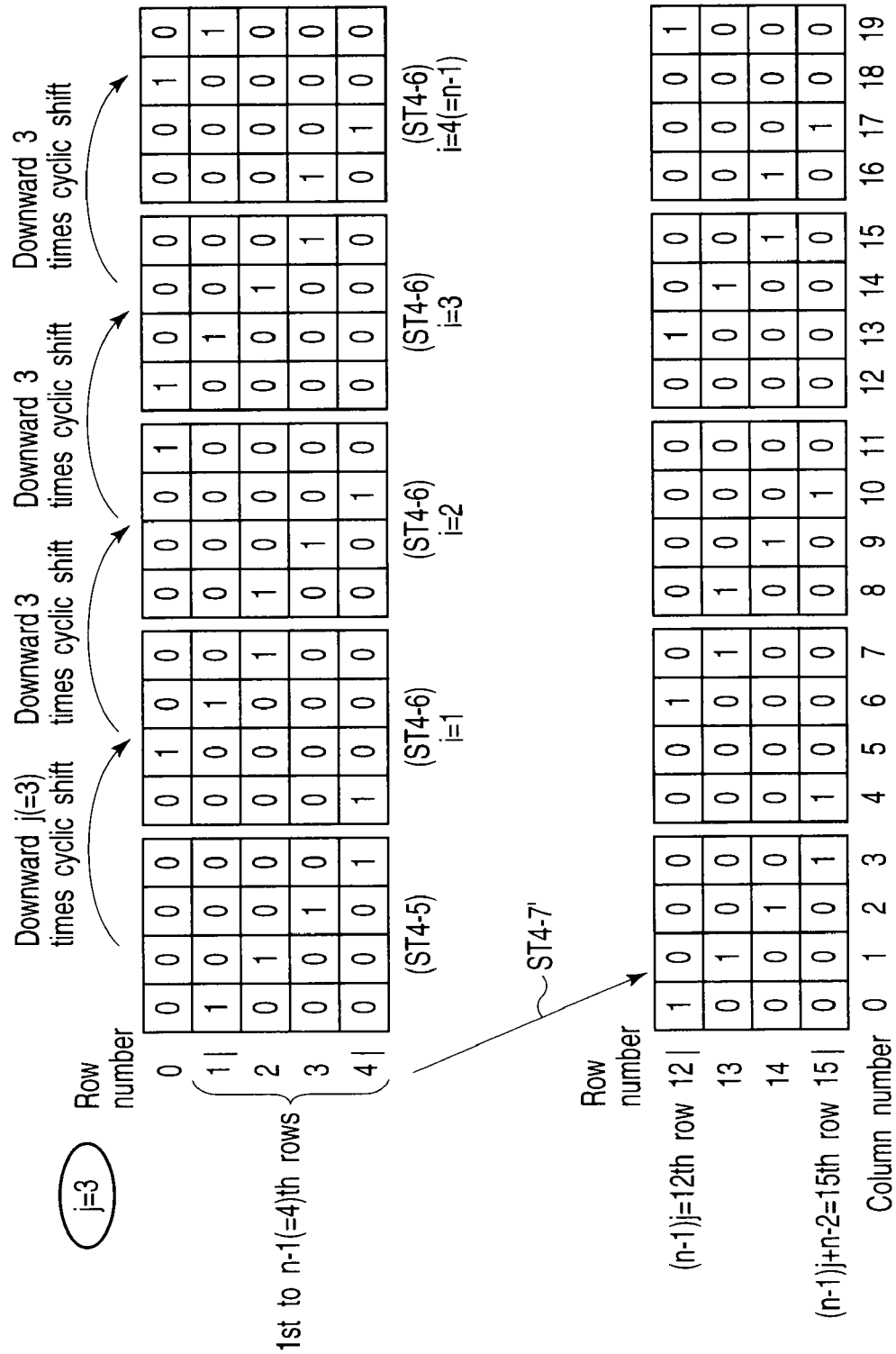
Figure 29:
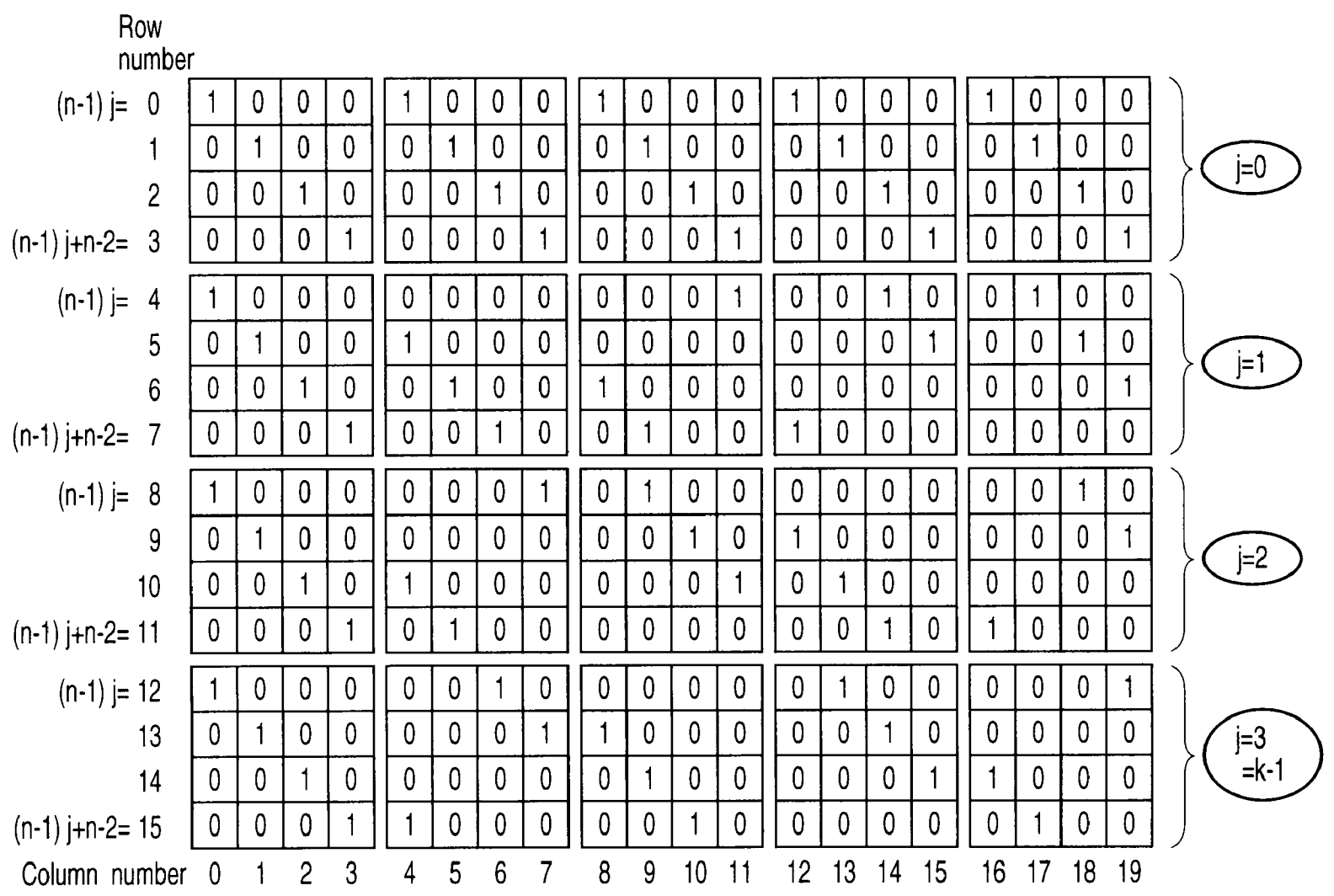

In this case, as shown in an example of the (4,5)-threshold scheme with k=4 and n=5 in FIG. 27, the 0th to 11th rows of the generator matrix G have the same values as those of the 4th to 15th rows in the case of j=0 to 2 shown in FIGS. 11 to 15, and the 12th to 15th rows of the generator matrix G have the same values as those in the case of j=3 as shown in FIGS. 28 and 29.

Figure 30:
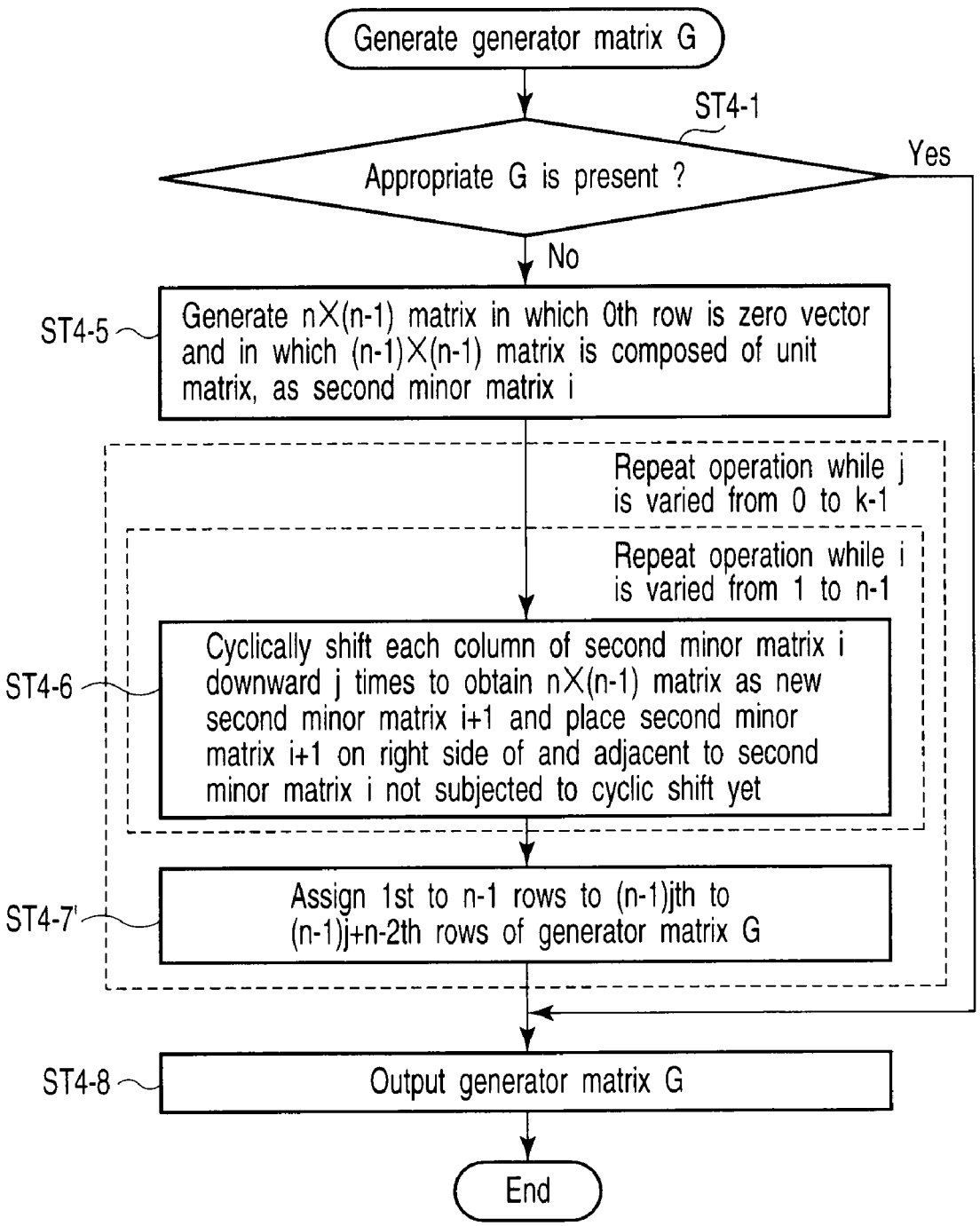
FIG. 30 is a flowchart illustrating the operation of a generator matrix generating process according to the third embodiment.

As shown in FIG. 30, in a method for generating the generator matrix G, steps ST4-2 to ST4-4 for the first minor matrix i in FIG. 8 are omitted, steps ST4-1, ST4-5, and ST4-6 are executed which are similar to steps ST4-1, ST4-5, and ST4-6 for the second minor matrix in FIG. 8, and step ST4-7 in FIG. 8 is replaced with step ST4-7' that uses the (n−1)jth to (n−1)j+n−2th rows of G as assignment rows. Furthermore, in this method, steps ST4-6 and ST4-7' are repeatedly executed with j varied from 0 to k−1.

That is, the generator matrix generating section 103 has a function of executing processes (P103b-1) to (P103b-6) described below.

(P103b-1) A process of, when the input sharing number n and threshold k are stored in the storage section 101, generating a second minor matrix of n rows×(n−1) columns in which the 0th row is a zero vector and in which the (n−1) rows×(n−1) columns under the 0th row correspond to a unit matrix, on the basis of the sharing number n and threshold k in the storage section 101.

(P103-2) A second adjacency process of cyclically shifting each of the columns of the rightmost second minor matrix downward j times to obtain a new second minor matrix of n rows×(n−1) columns and placing the new second minor matrix on the right side of and adjacent to the second minor matrix not subjected to the cyclic shift yet (j=0, 1, ... , k−1).

(P103b-3) A second submatrix generating process of executing the second adjacency process n−1 times to generate a second submatrix of n rows×(n−1) columns.

(P103b-4) A second submatrix assigning process of assigning the 1st to n−1th rows of the second submatrix to the (n−1)jth to (n−1)j+n−2th rows of the generator matrix G to generate a submatrix corresponding to the (n−1)jth to (n−1)j+n−2th rows of the generator matrix G (j=0, 1, ... , k−1).

(P103b-5) A process of, with the value of j in the second adjacency process and the second submatrix assigning process varied from the initial value 0 to the final value k−1, executing the second adjacency process, the second submatrix generating process, and the second submatrix assigning process k times, while increasing the value of j by one every time the second adjacency process, the second submatrix generating process, and the second submatrix assigning process are executed.

(P103-6) A process of obtaining a generator matrix G of k(n−1) rows×n(n−1) columns from the submatrix from the 0th to (n−1)(k−1)+n−2th rows assigned by the k second dividing and assigning process.

In the present embodiment, steps ST4-2 to ST4-4 for the first minor matrix are omitted. Consequently, the term "second" may be omitted from the above-described second minor matrix, second submatrix, second adjacency process, and second submatrix generating process, and second submatrix assigning process.

Figure 31:
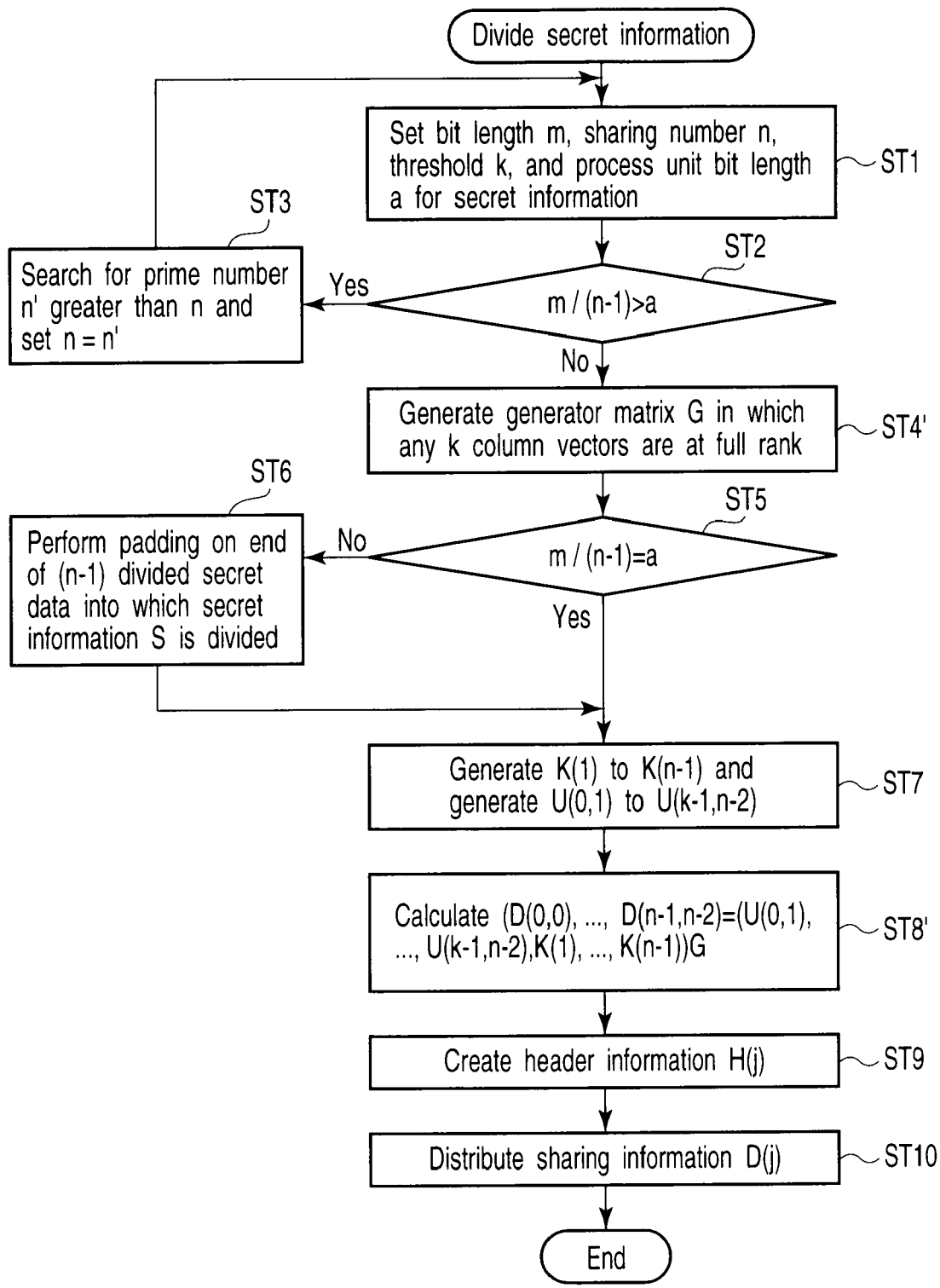
FIG. 31 is a flowchart illustrating the operation of a sharing process according to the third embodiment.
Figure 32:
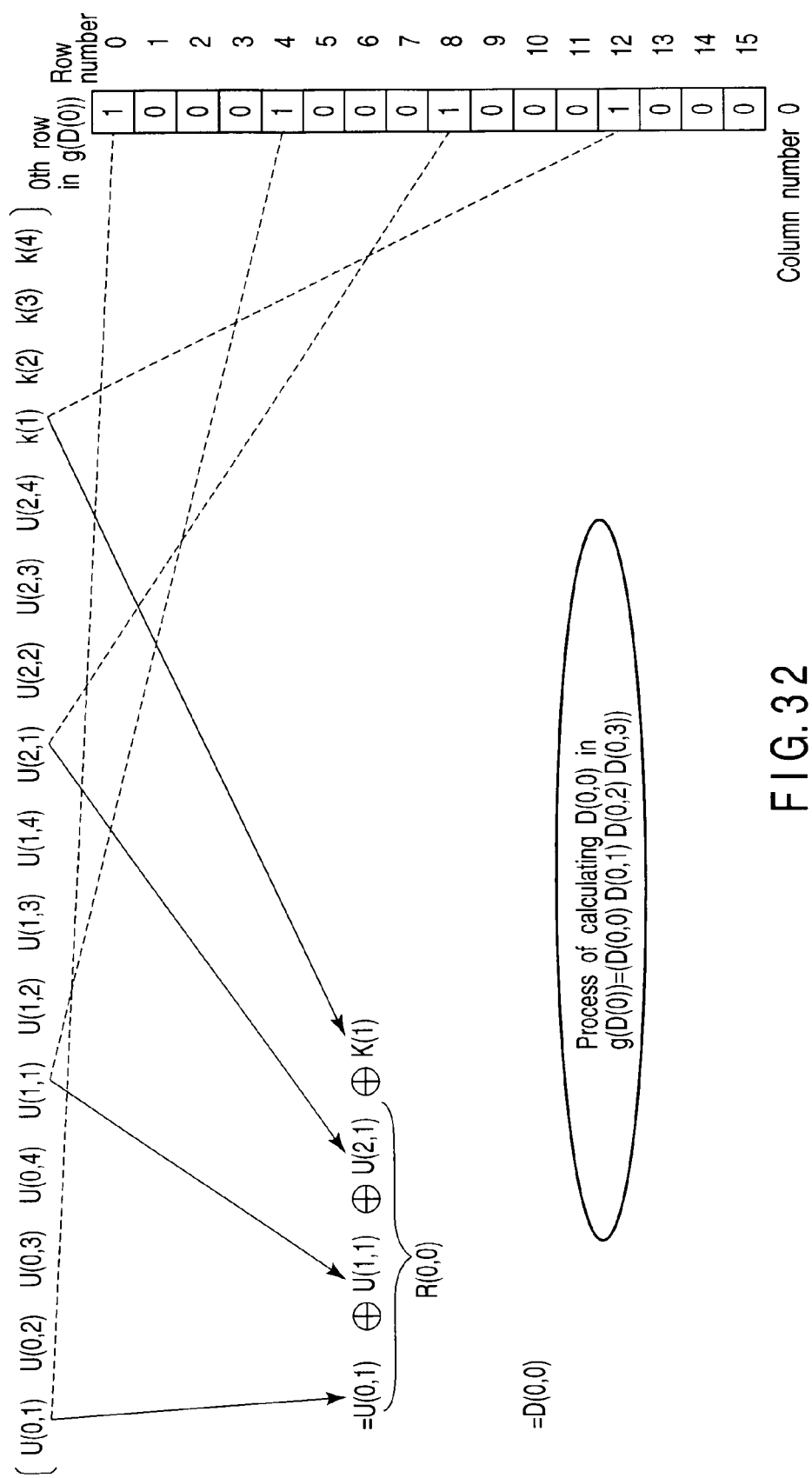
FIG. 32 is a schematic diagram illustrating a process of calculating sharing partial data according to the third embodiment.

Furthermore, in connection with the change in the generator matrix G, in matrixes integrated on the generator matrix G from leftward to calculate sharing partial data, the sharing secret data K(1) to K(n−1) are arranged on the right side of the random number data U(0,1), ... , U(h,g), ... , U(k−2,n−1) as shown in step ST8' in FIG. 31 and in FIG. 32. This arrangement is opposite to that in step ST8 in FIG. 7, described above.

n(n−1) sharing partial data D(j,i) are generated by the sharing partial data generating section 105 as shown in FIGS. 33 and 5 by way of example (n=4, n=5).

In this case, the function (f105-3) of the sharing partial data generating section 105 changes to a function (f105-3').

(f105-3') A function of calculating the product of the matrix (U(0,1), ... , U(h,g), ... , U(k−2,n−1), K(1), ... , K(j), ... , K(n−1)) and the generator matrix G on the basis of the random number data U(0,1), U(h,g), ... , U(k−2,n−1), the sharing secret data K(1), ... , K(j), ... , K(n−1), and the generator matrix G (the calculation is performed on GF(2)) and assigning the data in the j×(n−1)+ith row of the calculation result to D(j,1) to calculate n(n−1) sharing partial data D(j,i) (0≦j≦n−1, 0≦i≦n−2).

Now, description will be given of the operation of the secret sharing system configured as described above.
(Operation of the Sharing Process)

It is assumed that steps ST1 to ST3 shown in FIG. 31 are executed as previously described and that the process then proceeds to step ST4'.

The generator matrix generating section 103 outputs the generator matrix G with the sharing number n and the threshold k (any k column vectors are at the full rank, the matrix G has a size of k(n−1)×n(n−1), and the column vector has a size of k(n−1)×(n−1)) to the control section 109 (ST4').

With reference to FIGS. 28 to 30, description will be given of the procedure of the process of generating the generator matrix G in step ST4'.

As shown in FIG. 30, the generator matrix generating section 103 retrieves the generator matrix G with the sharing number n and the threshold k from the storage section 101 (ST4-1). If the appropriate generator matrix G is present, the generator matrix generating section 103 proceeds to ST4-8. If the appropriate generator matrix G is not present, then as shown in FIG. 11, the generator matrix generating section 103 generates the second minor matrix i of n rows×(n−1) columns in which the 0th row is a zero vector and in which the (n−1)× (n−1) matrix under the 0th row is composed of a unit matrix (ST4-5).

Figure 12:
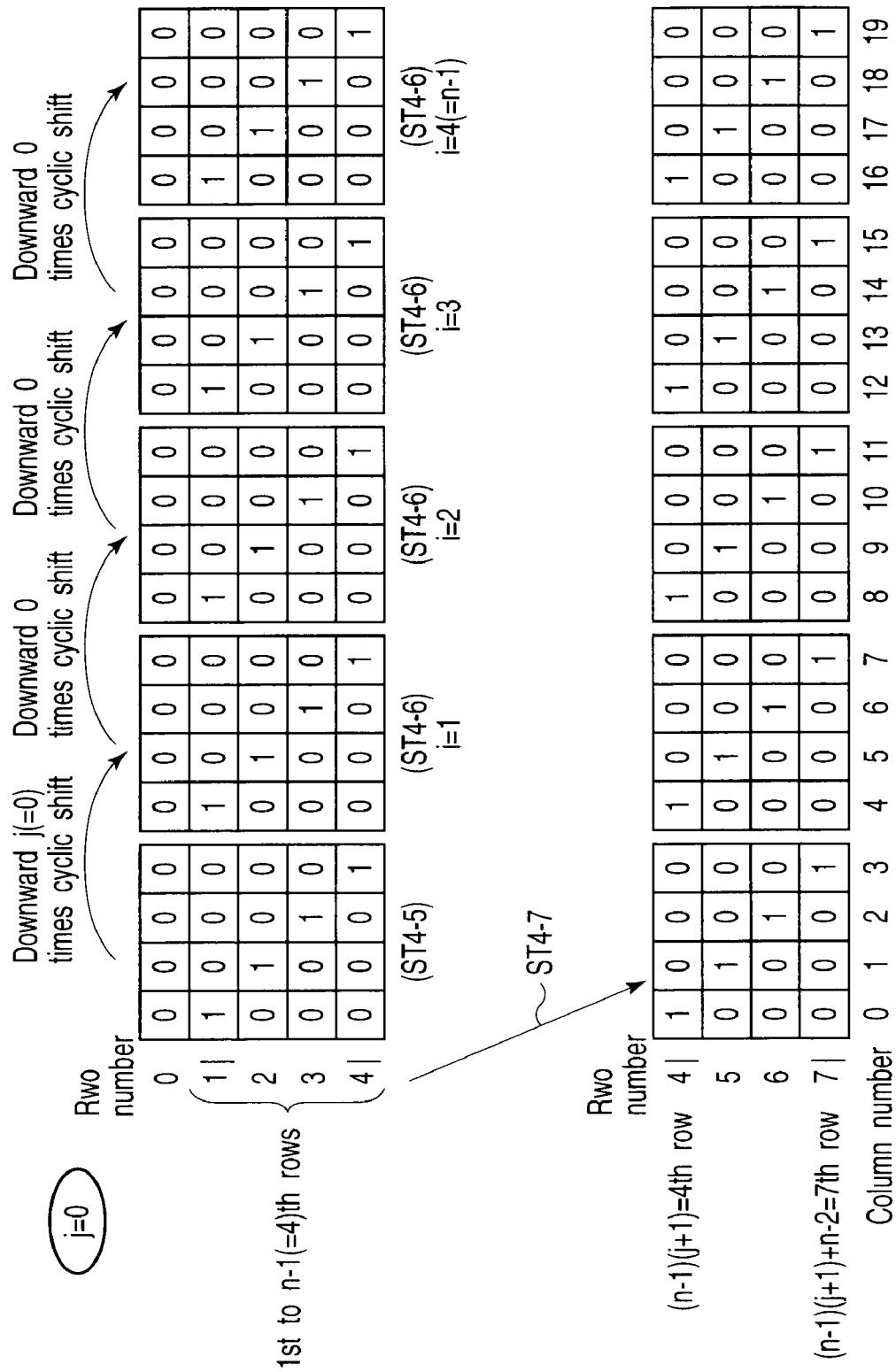
Figure 13:
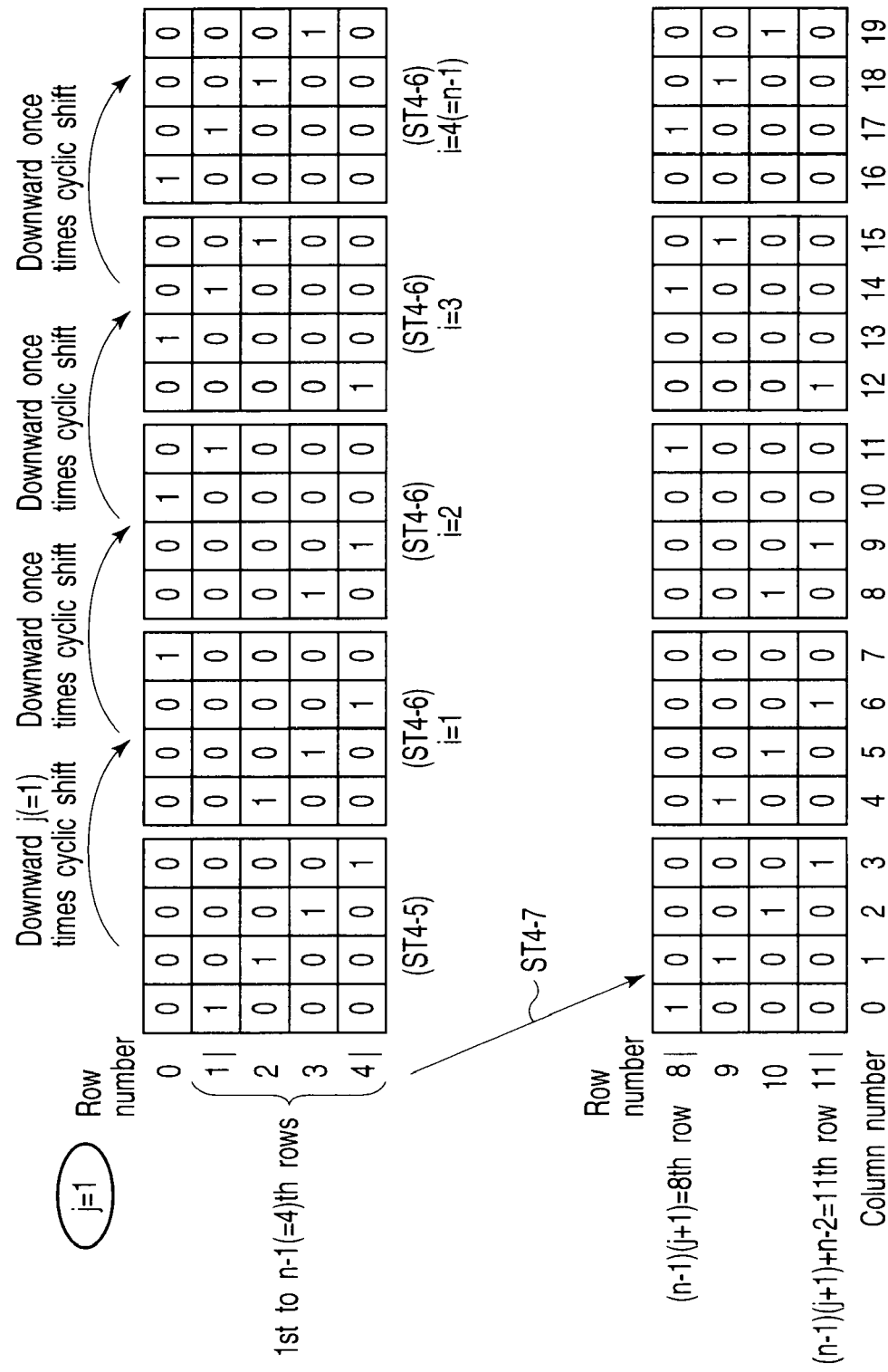
Figure 14:
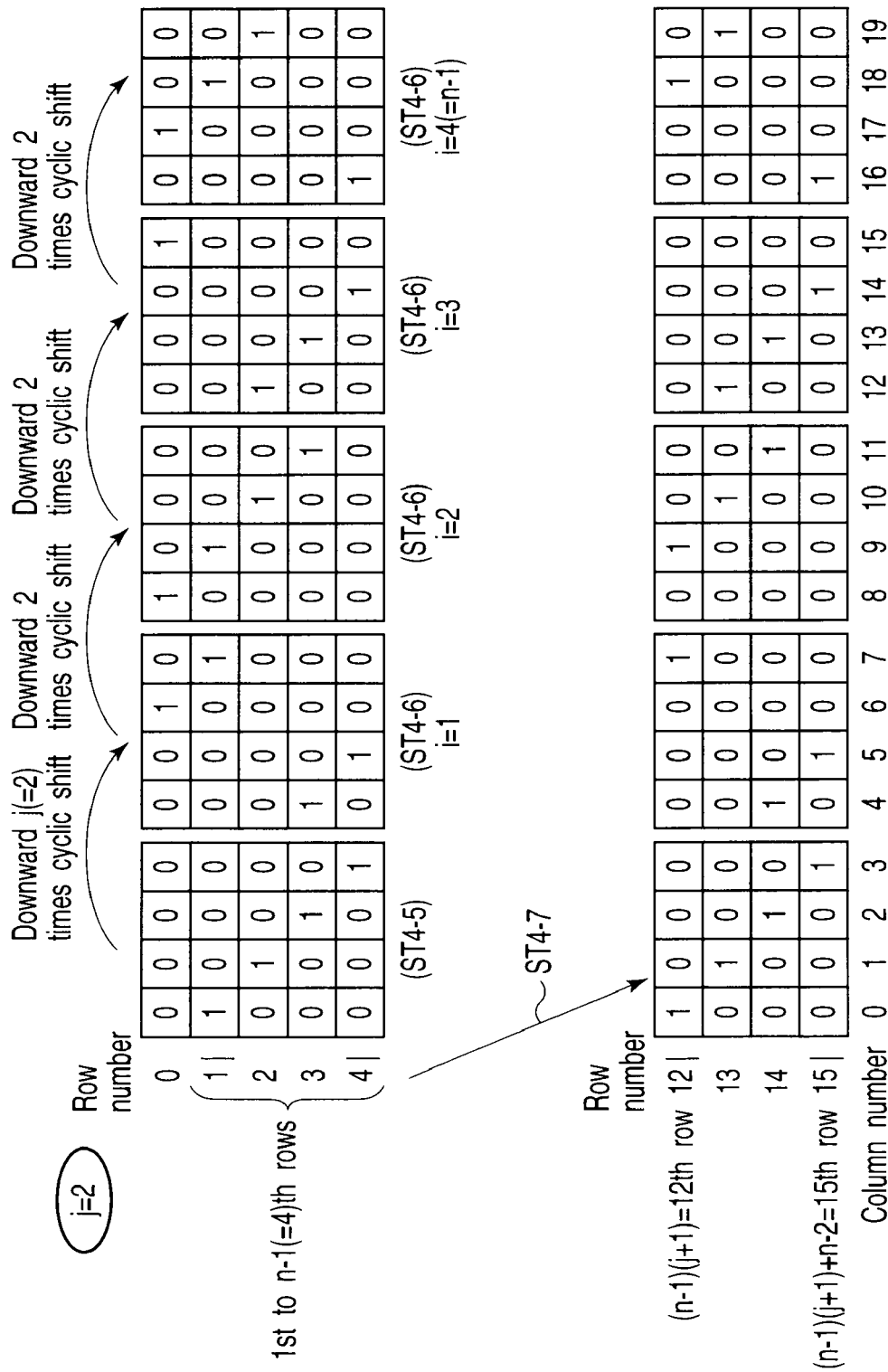

Subsequently, as shown in the upper parts of FIGS. 12 to 14 and in FIG. 28, the generator matrix generating section 103 cyclically shifts each of the columns of the (rightmost) second minor matrix i downward j times to obtain an n×(n−1) matrix as a new second minor matrix i+1. The generator matrix generating section 103 then places the second minor matrix i+1 on the right side of and adjacent to the second minor matrix i not subjected to the cyclic shift (ST4-6). The generator matrix generating section 103 repeats ST4-6 while varying i from 1 to n−1 to generate a second submatrix of n×n(n−1). Then, as shown in FIG. 29, the generator matrix generating section 103 assigns the 1st to n−1th rows of the second submatrix to the (n−1)jth to (n−1)j+n−2th rows of the generator matrix G, while incrementing j (ST4-7'). The generator matrix generating section 103 repeats ST4-6 to ST4-7' while varying j from 0 to k−1 to generate the generator matrix G. In the example of the (4,5)-threshold matrix, the generator matrix G is configured as shown in FIG. 27.

Subsequently, the generator matrix generating section 103 outputs the resulting generator matrix G to the control section 109 (ST4-8).

The process of generating the generator matrix G is completed as described above.

It is assumed that after step ST4 is completed, steps ST5 to ST7 shown in FIG. 31 are executed as previously described and that the process then proceeds to step ST8'.

The sharing partial data generating section 105 calculates the product of the generator matrix G and the matrix (U(0,1), ..., U(h,g), ..., U(k−1,n−1), K(1), ..., K(j), ..., K(n−1)), made up of the random number data U(0,1), ..., U(h,g), ..., U(k−2,n−1) and the sharing secret data K(1), ..., K(j), ..., K(n−1) (ST8') to calculate n(n−1) sharing partial data D(j,i). In the example of the (4,5)-threshold scheme, 20 sharing partial data D(j,i) are generated as shown in FIGS. 33 and 5. For example, the process of calculating sharing partial data D(0,0) is shown in FIG. 32.

Then, steps ST9 and ST10 are executed as previously described to complete the sharing process.

(Operation of the Restoring Process)

The operation of the restoring process is executed as described above with reference to FIG. 17. Strictly speaking, since the bit pattern of the generator matrix G is different from that described above, the following are also different from those described above: the bit pattern of the submatrix (g(D) (i_1)), ..., g(D(i_j)), ..., g(Di_k)), made up of any k column vectors of the generator matrix G, and the bit pattern of the inverse submatrix $(g(D)(i\_1)), \ldots, g(D(i\_j)), \ldots, g(Di\_k))^{-1}$ of the generator matrix G. However, in spite of the different bit patterns, the operation of the restoring process is still executed as described above.

As described above, the present embodiment exerts effects similar to those of the first embodiment even when configured to generate the generator matrix G of the bit pattern different from that according to the first embodiment.

Furthermore, steps ST4-2 to ST4-4 according to the first embodiment are omitted to enable the simplification of the generation algorithm for the generator matrix G. Additionally, although the omission of steps ST4-2 to ST4-4 increase the number of times that steps ST4-6 to ST4-7' are repeated, by one, the generation algorithm is still simplified as a result of the repetition of similar steps.

The technique described above for the embodiment can be stored as a program to be executed by a computer in memory mediums including magnetic disks (floppy disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the OS (operating system) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

What is claimed is:

1. A secret sharing apparatus based on a (k,n)-threshold scheme and configured to individually distribute n ($n \leq k \leq 4$) pieces of sharing information D(0), ..., D(n−1) into which secret information S is divided, to n storage apparatuses and to restore the secret information S from any k of the n pieces of sharing information, the apparatus comprising:

a generator matrix generating device configured to generate a generator matrix G of GF(2) comprising n column vectors each having a size of k(n−1) rows×(n−1) columns, any k of the n column vectors being at a full rank (the generator matrix G has a size of k(n−1) rows×n(n−1) columns and GF(2) is a finite field of order 2);

a storage device configured to temporarily store the secret information S before the distribution of the sharing information D(0) to D(n−1);

a divided secret data generating device configured to divide the secret information into n−1 pieces and to assign a row number j (1≦j≦n−1) varying from 1 to n−1 to a division result to generate n−1 first divided secret data K(1), ..., K(j), ..., K(n−1) having the same size;

a random number data generating device configured to generate (k−1)(n−1) random numbers each of the same size as that of each of the divided secret data and to assign a row number h (0≦h≦k−2) and a column number g (1≦g≦n−1) to the random numbers to generate random number data U(0,1), ..., U(h,g), ..., U(k−1, n−1);

a sharing partial data calculating device configured to calculate a product of matrixes of the divided secret data and random number data (K(1), ..., K(j), ..., K(n−1), U(0,1), ..., U(h,g), ..., U(k−2,n−1)) and the generator matrix G (the calculation is performed on GF(2)) and to assign a j×(n−1)+ith column which is a calculation result to sharing partial data D(j,i) to calculate n(n−1) sharing partial data D(j,i) (0≦j≦n−1, 0≦i≦n−2);

a header information generating device configured to assign the row number j to every n−1 sharing partial data D(j,0) to D(j,n−2) having the same row number j to generate n pieces of header information H(0), ..., H(j), ..., H(n−1); and a sharing information distributing device configured to individually distribute n pieces of sharing information D(0), ..., D(j), ..., D(n−1) comprising the header information H(j) and sharing partial data D(j,0) to D(j, n−2) having the same row number j, to the n storage apparatuses.

2. The secret distributing apparatus according to claim 1, wherein the sharing information distributing device individually places the n column vectors in the n pieces of sharing information D(0), ..., D(n−1), and the secret sharing apparatus further comprises:

a device configured to obtain k column vectors from k pieces of sharing information collected from any k of the n storage apparatuses;

a device configured to form a submatrix of the generator matrix from the k column vectors and to calculate an inverse matrix of the submatrix, a device configured to calculate a product of matrixes of the collected k pieces of sharing information and the inverse matrix (the calculation is performed on GF(2)) to obtain the divided secret data K(1), ..., K(j), ..., K(n−1); and a device configured to restore the secret information S from the resulting divided secret data K(1), ..., K(j), ..., K(n−1).

3. A secret sharing method performed by the secret sharing apparatus according to claim 1, the method comprising:

storing an input sharing number n and an input threshold k in the storage device;

generating, by the generator matrix generating device, a first minor matrix of n rows×(n−1) columns in which (n−1) rows×(n−1) columns under the 0th row have a laterally symmetrical relationship with a unit matrix;

executing, by the generator matrix generating device, a first adjacency process of cyclically shifting each of the columns of a leftmost first minor matrix upward once to obtain a new first minor matrix of n rows×(n−1) columns and placing the first minor matrix on a left side of and adjacent to the first minor matrix not subjected to the cyclic shift yet;

executing, by the generator matrix generating device, the first adjacency process n−1 times to generate a first submatrix of n rows×n(n−1) columns;

executing, by the generator matrix generating device, a first submatrix assigning process of assigning a 1st row to an n−1th row of the first submatrix to a 0th row to an n−2th row of the generator matrix G to generate a submatrix corresponding to the 0th to n−2th rows of the generator matrix G;

executing, by the generator matrix generating device, a process of generating a second minor matrix of n rows× (n−1) columns in which a 0th row is a zero vector and in which (n−1) rows×(n−1) columns under the 0th row correspond to a unit matrix;

executing, by the generator matrix generating device, a second adjacency process of cyclically shifting each of the columns of a leftmost second minor matrix downward j times to obtain a new second minor matrix of n rows×(n−1) columns and placing the second minor matrix on the right side of and adjacent to the second minor matrix not subjected to the cyclic shift yet (j=0, 1, ..., k−2);

executing, by the generator matrix generating device, a second submatrix generating process of executing the second adjacency process n−1 times to generate a second submatrix of n rows×n(n−1) columns;

executing, by the generator matrix generating device, a second submatrix assigning process of assigning a 1st row to an n−1th row of the second submatrix to an (n−1)(j+1)th row to an (n−1)(j+1)+n−2th row of the generator matrix G to generate a submatrix corresponding to the (n−1)(j+1)th to (n−1)(j+1)+n−2th rows of the generator matrix G (j=0, 1, ..., k−2);

executing, by the generator matrix generating device, a process of, with a value of j for the second adjacency process and the second submatrix assigning process varied from an initial value 0 to a final value k−2, executing the second adjacency process, the second submatrix generating process, and the second submatrix assigning process k−1 times while increasing a value of j by one every time the second submatrix generating process and the second submatrix assigning process are executed; and executing, by the generator matrix generating device, a process of generating the generator matrix G of k(n−1) rows×n(n−1) columns of whose 0th to n−2th rows are a result from the assignment of the first submatrix assigning process and whose n−1th to (n−1)(k−1)+n−2th rows are a result from the assignment of the second submatrix assigning process repeated k−1 times.

4. A secret sharing apparatus based on a (k,n)-threshold scheme and configured to individually distribute n (n≦k≦4) pieces of sharing information D(0), ..., D(n−1) into which secret information S is divided, to n storage apparatuses and to restore the secret information S from any k of the n pieces of sharing information, the apparatus comprising:

a generator matrix generating device configured to generate a generator matrix G of GF(2) comprising n column vectors each having a size of k(n−1) rows×(n−1) columns, any k of the n column vectors being at a full rank (the generator matrix G has a size of k(n−1) rows×n(n−1) columns and GF(2) is a finite field of order 2);

a storage device configured to temporarily store the secret information S before the distribution of the sharing information D(0) to D(n−1);

a divided secret data generating device configured to divide the secret information into n−1 pieces and to assign a row number j (1≦j≦n−1) varying from 1 to n−1 to a division result to generate n−1 first divided secret data K(1), . . . , K(j), . . . , K(n−1) having the same size;

a random number data generating device configured to generate (k−1)(n−1) random numbers each of the same size as that of each of the divided secret data and to assign a row number h (0≦h≦k−2) and a column number g (1≦g≦n−1) to the random numbers to generate random number data U(0,1), . . . , U(h,g), . . . , U(k−1, n−1);

a sharing partial data calculating device configured to calculate a product of matrixes of the random number data and the divided secret data (U(0,1), U(h,g), U(k−2,n−1), K(1), . . . , K(j), K(n−1)) and the generator matrix G (the calculation is performed on GF(2)) and to assign a j×(n−1)+ith column which is a calculation result to sharing partial data D(j,i) to calculate n(n−1) sharing partial data D(j,i) (0≦j≦n−1, 0≦i≦n−2);

a header information generating device configured to assign the row number j to every n−1 sharing partial data D(j,0) to D(j,n−2) having the same row number j to generate n pieces of header information H(0), . . . , H(j), . . . , H(n−1); and a sharing information distributing device configured to individually distribute n pieces of sharing information D(0), . . . , D(j), . . . , D(n−1) comprising the header information H(j) and sharing partial data D(j,0) to D(j, n−2) having the same row number j, to the n storage apparatuses.

5. The secret distributing apparatus according to claim 4, wherein the sharing information distributing device individually places the n column vectors in the n pieces of sharing information D(0), . . . , D(n−1), and the secret sharing apparatus further comprises:

a device configured to obtain k column vectors from k pieces of sharing information collected from any k of the n storage apparatuses;

a device configured to form a submatrix of the generator matrix from the k column vectors and to calculate an inverse matrix of the submatrix, a device configured to calculate a product of matrixes of the collected k pieces of sharing information and the inverse matrix (the calculation is performed on GF(2)) to obtain the divided secret data K(1), . . . , K(j), . . . , K(n−1); and a device configured to restore the secret information S from the resulting divided secret data K(1), . . . , K(j), . . . , K(n−1).

6. A secret sharing apparatus based on a (k,n)-threshold scheme and configured to individually distribute n (n≧k≧4) pieces of sharing information D(0), . . . , D(n−1) into which secret information S is divided, to n storage apparatuses and to restore the secret information S from any k of the n pieces of sharing information, the apparatus comprising:

a storage device configured to temporarily store the secret information S before the distribution of the sharing information D(0) to D(n−1);

a first divided secret data generating device configured to divide the secret information into n−1 pieces and to assign a row number j (1≦j≦n−1) varying from 1 to n−1 to a division result to generate n−1 first divided secret data K(1), . . . , K(j), . . . , K(n−1) having the same size;

a second divided secret data generating device configured to create a zero value of the same size as that of each of the divided secret data and to assign the row number j=0 to a creation result to generate second divided secret data K(0);

a first random number data generating device configured to create k−1 zero value data each of the same size as that of each divided secret data and to assign a row number h (0≦h≦k−2) and a column number g=0 to the zero value data to generate random number data U(0,0), . . . , U(h, 0), . . . , U(k−2,0);

a second random number data generating device configured to generate (n−1)(k−1) random numbers each of the same size as that of each divided secret data and to assign the row number h (0≦h≦k−2) and the column number g (1≦g≦n−1) to the random numbers to generate random number data U(0,1), . . . , U(h, g), . . . , U(k−2,n−1);

a random number data calculating device configured to calculate n(n−1) random number data R(j,i)=U (0, (h×j+i+1)mod n)(+) . . . (+)U (h, (h×j+i+1)mod n)(+) . . . (+)U (k−1, (h×j+i+1)mod n)(+) on the basis of the random number data U(0,0), U(h, g), U(k−2,n−1) ((+) is a symbol representing exclusive OR);

a sharing partial data calculating device configured to calculate n(n−1) sharing partial data D(j,i)=K(j−1(mod n)) (+)R(j,i) on the basis of the sharing partial data K(0), K(1), . . . , K(j), . . . , K(n−1) and the random number data R(0,0), . . . , R(i,j), . . . , R(n−1,n−2);

a header information generating device configured to assign the row number j to every n−1 pieces of sharing partial data D(j,0) to D(j,n−2) which are included in the generated sharing partial data and which have the same row number j, to generate n pieces of header information H(0), . . . , H(j), . . . , H(n−1); and a sharing information distributing device configured to individually distribute the n pieces of sharing information D(0), . . . , D(j), . . . , D(n−1) comprising the header information H(j) and sharing partial data D(j,0) to D(j, n−2) having the same row number j, to the n storage apparatuses.

7. A non-transitory computer-readable medium storing computer readable instructions thereon for a computer in a secret sharing apparatus based on a (k,n)-threshold scheme, the instructions when executed by the computer performing a method comprising:

individually distributing n (n≧k≧4) pieces of sharing information D(0), . . . , D(n−1) into which secret information S is divided, to n storage apparatuses;

restoring the secret information S from any k of the n pieces of sharing information;

sequentially executing a process of generating a generator matrix G of GF(2) comprising n column vectors each having a size of k(n−1) rows×(n−1) columns, any k of the n column vectors being at a full rank (the generator matrix G has a size of k(n−1) rows×n(n−1) columns and GF(2) is a finite field of order 2);

executing a process of temporarily writing the secret information S to a memory in the computer before the distribution of the sharing information D(0) to D(n−1);

sequentially executing a process of dividing the secret information in the memory into n−1 pieces and to assign a row number j (1≦j≦n−1) varying from 1 to n−1 to a division result to generate n−1 divided secret data K(1), . . . , K(j), . . . , K(n−1) having the same size;

sequentially executing a process of generating $(k-1)(n-1)$ random numbers each of the same size as that of each of the divided secret data and to assign a row number h $(0 \leq h \leq k-2)$ and a column number g $(1 \leq g \leq n-1)$ to the random numbers to generate random number data $U(0, 1), \ldots, U(h,g), \ldots, U(k-1,n-1)$;

sequentially executing a process of calculating a product of matrixes of the divided secret data and random number data $(K(1), \ldots, K(j), \ldots, K(n-1), U(0,1), \ldots, U(h,g), \ldots, U(k-2,n-1))$ and the generator matrix G (the calculation is performed on GF(2)) and to assign a j×(n−1)+ith column which is a calculation result to sharing partial data $D(j,i)$ to calculate $n(n-1)$ sharing partial data $D(j,i)$ $(0 \leq j \leq n-1, 0 \leq i \leq n-2)$;

sequentially executing a process of assigning the row number j to every n−1 sharing partial data $D(j,0)$ to $D(j,n-2)$ having the same row number j to generate n pieces of header information $H(0), \ldots, H(j), \ldots, H(n-1)$; and sequentially executing a process of individually distributing n pieces of sharing information $D(0), \ldots, D(j), \ldots, D(n-1)$ comprising the header information $H(j)$ and sharing partial data $D(j,0)$ to $D(j,n-2)$ having the same row number j, to the n storage apparatuses.

8. The non-transitory computer-readable medium according to claim 7, wherein the step of executing a process of distributing includes a procedure of individually placing the n column vectors in the n pieces of sharing information $D(0), \ldots, D(n-1)$, and further comprising:

sequentially executing a process of obtaining k column vectors from k pieces of sharing information collected from any k of the n storage apparatuses;

sequentially executing a process of forming a submatrix of the generator matrix from the k column vectors and to calculate an inverse matrix of the submatrix, sequentially executing a process of calculating a product of matrixes of the collected k pieces of sharing information and the inverse matrix (the calculation is performed on GF(2)) to obtain the divided secret data $K(1), \ldots, K(j), \ldots, K(n-1)$; and sequentially executing a process of restoring the secret information S from the resulting divided secret data $K(1), \ldots, K(j), \ldots, K(n-1)$.

9. A non-transitory computer-readable medium storing computer readable instructions thereon for a computer in a secret sharing apparatus based on a (k,n)-threshold scheme, the instructions when executed by the computer performing a method comprising:

individually distributing n $(n \geq k \geq 4)$ pieces of sharing information $D(0), \ldots, D(n-1)$ into which secret information S is divided, to n storage apparatuses;

restoring the secret information S from any k of the n pieces of sharing information;

sequentially executing a process of temporarily writing the secret information S to a memory in the computer before the distribution of the sharing information $D(0)$ to $D(n-1)$;

sequentially executing a process of dividing the secret information into n−1 pieces and assigning a row number j $(1 \leq j \leq n-1)$ varying from 1 to n−1 to a division result to generate n−1 first divided secret data $K(1), \ldots K(j), \ldots K(n-1)$ having the same size;

sequentially executing a process of creating a zero value of the same size as that of each of the divided secret data and assigning the row number j=0 to a creation result to generate second divided secret data $K(0)$;

sequentially executing a process of creating k−1 zero value data each of the same size as that of each divided secret data and assigning a row number h $(0 \leq h \leq k-2)$ and a column number g=0 to the zero value data to generate random number data $U(0,0), U(h, 0), U(k-2,0)$;

sequentially executing a process of generating $(n-1)(k-1)$ random numbers each of the same size as that of each divided secret data and assigning the row number h $(0 \leq h \leq k-2)$ and the column number g $(1 \leq g \leq n-1)$ to the random numbers to generate random number data $U(0,1), \ldots, U(h, g), \ldots, U(k-2,n-1)$;

sequentially executing a process of calculating $n(n-1)$ random number data $R(j,i)=U(0, (h \times j+i+1) \mod n)(+) \ldots (+)U(h, (h \times j+i+1) \mod n)(+) \ldots (+)U(k-1, (h \times j+i+1) \mod n)$ on the basis of the random number data $U(0,0), \ldots, U(h, g), \ldots, U(k-2,n-1)$ ((+) is a symbol representing exclusive OR);

sequentially executing a process of calculating $n(n-1)$ sharing partial data $D(j,i)=K(j-1(\mod n))(+)R(j,i)$ on the basis of the sharing partial data $K(0), K(1), \ldots, K(j), \ldots, K(n-1)$ and the random number data $R(0,0), \ldots, R(i,j), \ldots, R(n-1,n-2)$;

sequentially executing a process of assigning the row number j to every n−1 pieces of sharing partial data $D(j,0)$ to $D(j,n-2)$ which are included in the generated sharing partial data and which have the same row number j, to generate n pieces of header information $H(0), \ldots, H(j), \ldots, H(n-1)$; and sequentially executing a process of individually distributing the n pieces of sharing information $D(0), \ldots, D(j), \ldots, D(n-1)$ comprising the header information $H(j)$ and sharing partial data $D(j,0)$ to $D(j,n-2)$ having the same row number j, to the n storage apparatuses.

\* \* \* \* \*